(12) United States Patent
Luis Burguete et al.

(10) Patent No.: US 10,514,841 B2
(45) Date of Patent: Dec. 24, 2019

(54) MULTI-LAYERED INK OBJECT

(71) Applicant: Microsoft Technology Licensing, LLC, Redmond, WA (US)

(72) Inventors: Marta Luis Burguete, Seattle, WA (US); Elise L. Livingston, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/966,520

(22) Filed: Apr. 30, 2018

(65) Prior Publication Data

US 2019/0332258 A1    Oct. 31, 2019

(51) Int. Cl.
| | |
|---|---|
| *G06T 15/00* | (2011.01) |
| *G06F 3/0488* | (2013.01) |
| *G06F 3/0482* | (2013.01) |
| *G06F 3/0354* | (2013.01) |
| *G06F 16/22* | (2019.01) |
| *G06F 3/041* | (2006.01) |

(52) U.S. Cl.
CPC ...... *G06F 3/04883* (2013.01); *G06F 3/03545* (2013.01); *G06F 3/0482* (2013.01); *G06F 16/2282* (2019.01); *G06T 15/00* (2013.01); *G06F 3/041* (2013.01)

(58) Field of Classification Search
CPC . G06T 15/00; G06F 3/04883; G06F 3/04882; G06F 3/03545; G06F 16/2282; G06F 3/041
USPC ......................................................... 345/418
See application file for complete search history.

(56) References Cited

U.S. PATENT DOCUMENTS

| | | | | |
|---|---|---|---|---|
| 7,756,335 B2* | 7/2010 | Sternby | .............. | G06K 9/00872 382/186 |
| 7,869,655 B2* | 1/2011 | Clary | .................. | G06F 3/04883 382/187 |
| 8,014,630 B1* | 9/2011 | Polyakov | ........... | G06K 9/00416 345/442 |
| 8,115,748 B2* | 2/2012 | Clary | .................. | G06F 3/03545 345/173 |

(Continued)

OTHER PUBLICATIONS

Hammond T, Paulson B. Recognizing sketched multistroke primitives. ACM Transactions on Interactive Intelligent Systems (TiiS). Oct. 1, 2011;1(1):4.*

(Continued)

*Primary Examiner* — Phu K Nguyen
(74) *Attorney, Agent, or Firm* — Talem IP Law, LLP

(57) ABSTRACT

An ink object component of a content creation application is provided that can transform an ink object into a multi-layered ink object that enables a user to move between the layers without losing access to the previous layers or the original ink object. One or more ink strokes can be received, displayed, and stored in an ink object. The ink object can be transformed into a multi-layered ink object by obtaining content objects based on recognized entities of the ink object and generating a data structure storing the content objects associated with the ink object. Conversion between layers of the multi-layered ink object can be performed in response to a designated gesture and can include displaying any of the content objects or the one or more ink strokes in place of the one or more ink strokes.

20 Claims, 25 Drawing Sheets

(56) References Cited

U.S. PATENT DOCUMENTS

| | | | | |
|---|---|---|---|---|
| 8,219,908 B2* | 7/2012 | Napper | .............. | G06K 9/00852 |
| | | | | 715/268 |
| 8,363,948 B2* | 1/2013 | Napper | ................ | G06K 9/6814 |
| | | | | 345/179 |
| 9,524,031 B2* | 12/2016 | Yeom | ....................... | G06F 3/017 |
| 10,228,775 B2* | 3/2019 | Zhou | ................... | G06F 3/03545 |

OTHER PUBLICATIONS

Delaye A, Liu CL. Contextual text/non-text stroke classification in online handwritten notes with conditional random fields. Pattern Recognition. Mar. 1, 2014;47(3):959-68.*

Blagojevic, R., 2011. Using data mining for digital ink recognition (Doctoral dissertation, ResearchSpace@ Auckland).*

Hse, Heloise Hwawen, and A. Richard Newton. "Recognition and beautification of multi-stroke symbols in digital ink." Computers & Graphics 29, No. 4 (2005): 533-546.*

Nhabuiduc, Mathcha—WYSIWYG Online Math Editor, Sep. 5, 2017, https://nhabuiduc.wordpress.com/2017/09/05/mathcha-wysiwyg-online-math-editor/.*

* cited by examiner

FIG. 4D

MULTI-LAYERED INK OBJECT

BACKGROUND

Content creation applications such as notebook applications, word processing applications, spreadsheet applications, and presentation applications are useful tools for generating and curating content. These and other content creation applications are increasingly including "inking" functionality that lets users input content and interact with the application (and content created therein) through using a pen or stylus (and sometimes fingers or other objects) in a manner evoking a pen on paper.

A user's ink strokes can be identified, for example, as a picture, diagram, shape, math, or text. Recognizing the content of the user's ink allows for an association of the ink with its meaning or exchange the ink strokes with the content it represents. For example, if a user is drawing a circle in the content creation application, the content creation application (via, for example, a recognition engine) can recognize the shape the ink strokes represent and display the shape to the user in place of the ink strokes.

Currently, ink objects only are able to live as ink objects. Once they are converted to another object they stop being related to their previous ink incarnation and the user is not allowed to revert back to their original content. For example, an undo command can restore the original version of the ink object but does not allow navigating back and forth between those two states, since they are different objects.

BRIEF SUMMARY

An ink object component and an ink object service for content creation applications are described. The ink object component and the ink object service can transform an ink object into a multi-layered ink object that enables a user to move between the layers without losing access to the previous layers or the original ink object.

A content creation application with an ink object component can receive one or more ink strokes. The one or more ink strokes can be displayed in a canvas interface and stored in an ink object. The ink object can be transformed into a multi-layered ink object by obtaining content objects based on recognized entities of the ink object and generating a data structure storing the content objects associated with the ink object. The ink object and the one or more of the content objects are stored in the generated data structure. Conversion between layers of the multi-layered ink object can be performed in response to a designated gesture. The converting between layers of the multi-layered ink object can include displaying, at the canvas interface, any of the content objects or the one or more ink strokes in the multi-layered ink object in place of the one or more ink strokes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4F illustrate an example scenario of providing multi-layered ink objects.

DETAILED DESCRIPTION

Figure 1:
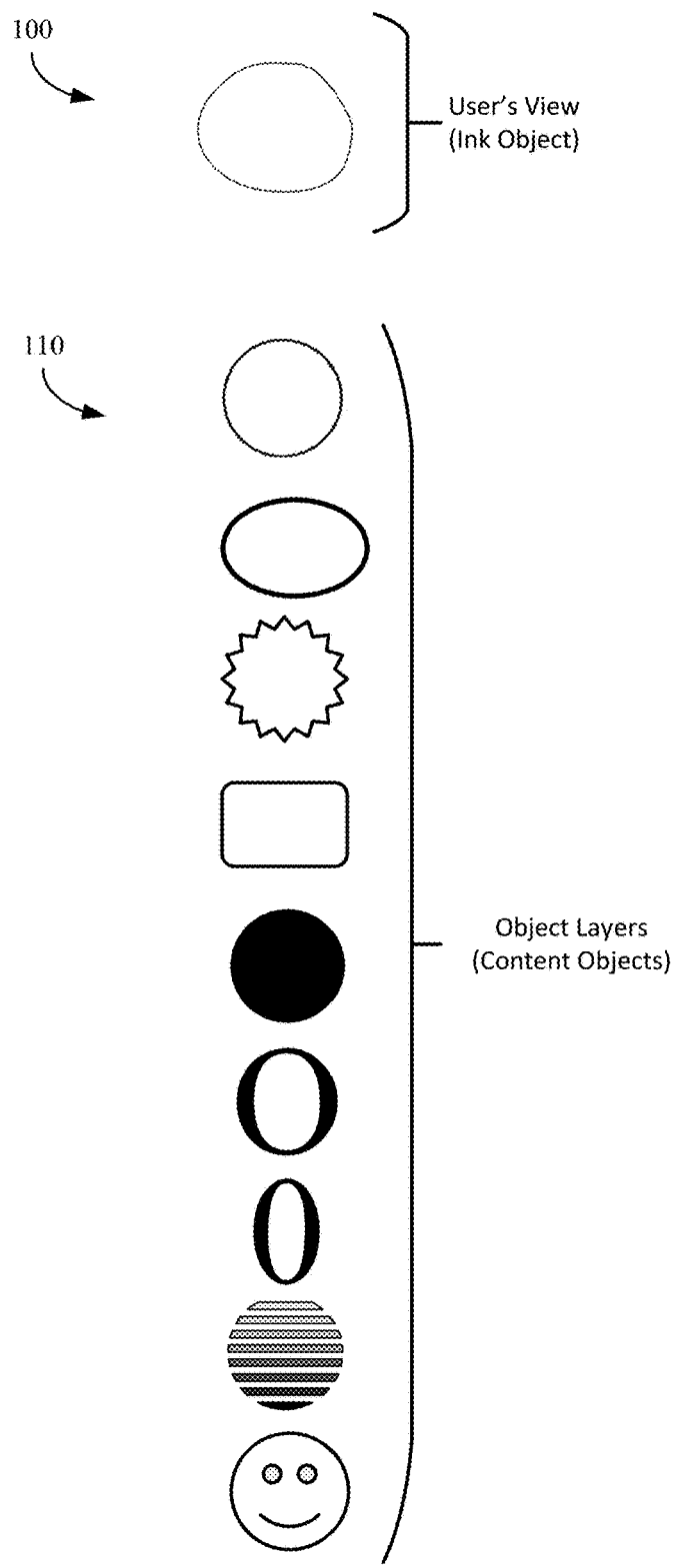
FIG. 1 illustrates a conceptual representation of an ink object that includes layers as described herein.

An ink object component and an ink object service for content creation applications are described. The ink object component and the ink object service can transform an ink object into a multi-layered ink object that enables a user to move between the layers without losing access to the previous layers or the original ink object.

A content creation application with an ink object component can receive one or more ink strokes. The one or more ink strokes can be displayed in a canvas interface and stored in an ink object. The ink object can be transformed into a multi-layered ink object by obtaining content objects based on recognized entities of the ink object and generating a data structure storing the content objects associated with the ink object. The ink object and the one or more of the content objects are stored in the generated data structure. Conversion between layers of the multi-layered ink object can be performed in response to a designated gesture. The converting between layers of the multi-layered ink object can include displaying, at the canvas interface, any of the content objects or the one or more ink strokes in the multi-layered ink object in place of the one or more ink strokes.

Content creation applications are software applications in which users can contribute information. As used herein, content creation applications are directed to visual content where users can create text and/or image-based content in digital form. The term "content creation application" may in some cases by synonymous with "content authoring application", "productivity application", or "content authoring tool". Since the described systems and techniques focus on applications and tools through which content is being authored, there is no distinction intended between these terms and such terms may be used interchangeably herein.

The described ink object feature is suitable for any content creation application that supports "inking" or "digital ink", which refers to the mode of user input where a stylus or pen (or even user finger on a touch screen or pad) is used to capture handwriting in its natural form.

An ink stroke refers to a set of properties and point data that a digitizer captures that represent the coordinates and properties of a "marking". It can be the set of data that is captured in a single pen down, up, or move sequence. The set of data can include parameters such as, but not limited to, a beginning of the stroke, an end of the stroke, the pressure of the stroke, the tilt (e.g., of a pen) for the stroke, the direction of the stroke, the time and timing of the stroke between discrete coordinates along the path of the stroke, and the color of the 'ink'.

During typical inking capture, a digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected.

A content creation application that supports inking can also include an ink analyzer. An ink analyzer is a feature that analyzes the ink strokes and identifies inked terms and other recognizable groupings of ink strokes. A grouping of ink strokes that are identified as forming a drawn unit (e.g., term or drawing) can be considered stored within a data structure of an ink object. The ink object can include metadata associated with the word or drawing as a whole, as well as the ink stroke parameters for each ink stroke in the ink object.

The ink object feature allows for the transformation of an ink object into a multi-layered ink object and enables conversion between layers of the multi-layered ink object.

Oftentimes customers find themselves scribing and or sketching ideas that they then want to convert. Conversions can be technically tricky and, even when executed 100% correct, may not satisfy the user's needs. For example, in cases where the inked word "hello" is converted to the text word "hello," the user may instead be looking to insert the word "Hello".

By being able to access additional layers of the multi-layered ink object, the user can be provided with a much richer functionality without increasing the interaction model complexity. The described technique of providing multi-layered ink objects can also open up the possibility of helping users with much more complex tasks by, for example, suggesting alternatives to the content that change dynamically with their ink and workflow.

Advantageously, the described techniques allow for the ability to keep going back to the original ink object, regardless of which layer is being displayed to the user.

The described techniques allow for the ability to access different layers of the multi-layered object based on what layer the user initially selected without having to undo or start from scratch. For example, the user may be provided different spelling variations for a word or slightly modified shapes.

The described techniques allow for the ability to access a different set of layers based on user context. For example, the user may be provided one or more content objects based on whether they are creating a flowchart or illustrating a slide.

The described techniques allow for the ability to show different content objects based on the user selection. For example, a selection of a group of shapes may provide a content object in the form of a house icon, while a selection of an individual triangle may not present a roof content object because the context of the user selection would not suggest that a roof would be useful to the user.

FIG. 1 illustrates a conceptual representation of an ink object that includes layers as described herein. Referring to FIG. 1, when a user inks a circle (100) on a canvas interface of a content creation application, the user will see an ink representation of the circle. To the user, it appears as the ink representation is a single ink object having only layer. However, the user is only viewing the top layer of an object that has many layers. The displayed ink representation of the circle is not just an ink object having one layer, but instead, has many alternate object layers (110). Each of these alternate object layers can be a content object based on recognized entities of the ink object. Advantageously, the described techniques transform the ink object into a multi-layered ink object, which includes the ink object and the content objects.

The object layers (110) shown in the conceptual representation of FIG. 1 are one-dimensional deep and include content objects, such as a circle (shape) content object, an oval content object, a rounded rectangle content object, a 16-point star content object, a filled circle content object, an art deco circle content object, and a smiley face content object, a letter "O" content object), and a number "0" content object.

The content objects, along with the original ink object, can be stored in a data structure, such as a table or other data structure. In some cases, the content objects can be organized by category. In this case, the object layers may be two-dimensional. In some cases, the objects in the data structure can be updated based on context information, such as user context information or context information of the content creation application, or based on further interaction with the objects.

Through the described techniques, a user can access and cycle through each of the layers of the multi-layered ink object (e.g., the content objects and the original ink object). The mechanism by which the user can cycle through the layers can be, for example, a menu interface, such as a contextual menu or a ribbon, or other interaction.

The layers can be presented to the user through the menu interface. When the user selects one of the layers, the selected content object will be displayed to the user on the canvas interface in place of the ink object. While, from the user's perspective, it appears as though the ink object has been converted, it is the display that has been converted. The user maintains access to all of the layers, including the ink object.

The user may continue to convert back and forth through the layers. Each time the user selects a layer, a subsequent call to a service is not required. Instead, the data structure storing the layers is accessed and the selected content object is displayed to the user in place of the previously displayed object.

Advantageously, the described techniques do not require tracking of state for the content creation application. Rather, the described techniques allow a user to move within the layers of the multi-layered ink object without losing access to the previous layers for at least a period of time.

Figure 2:
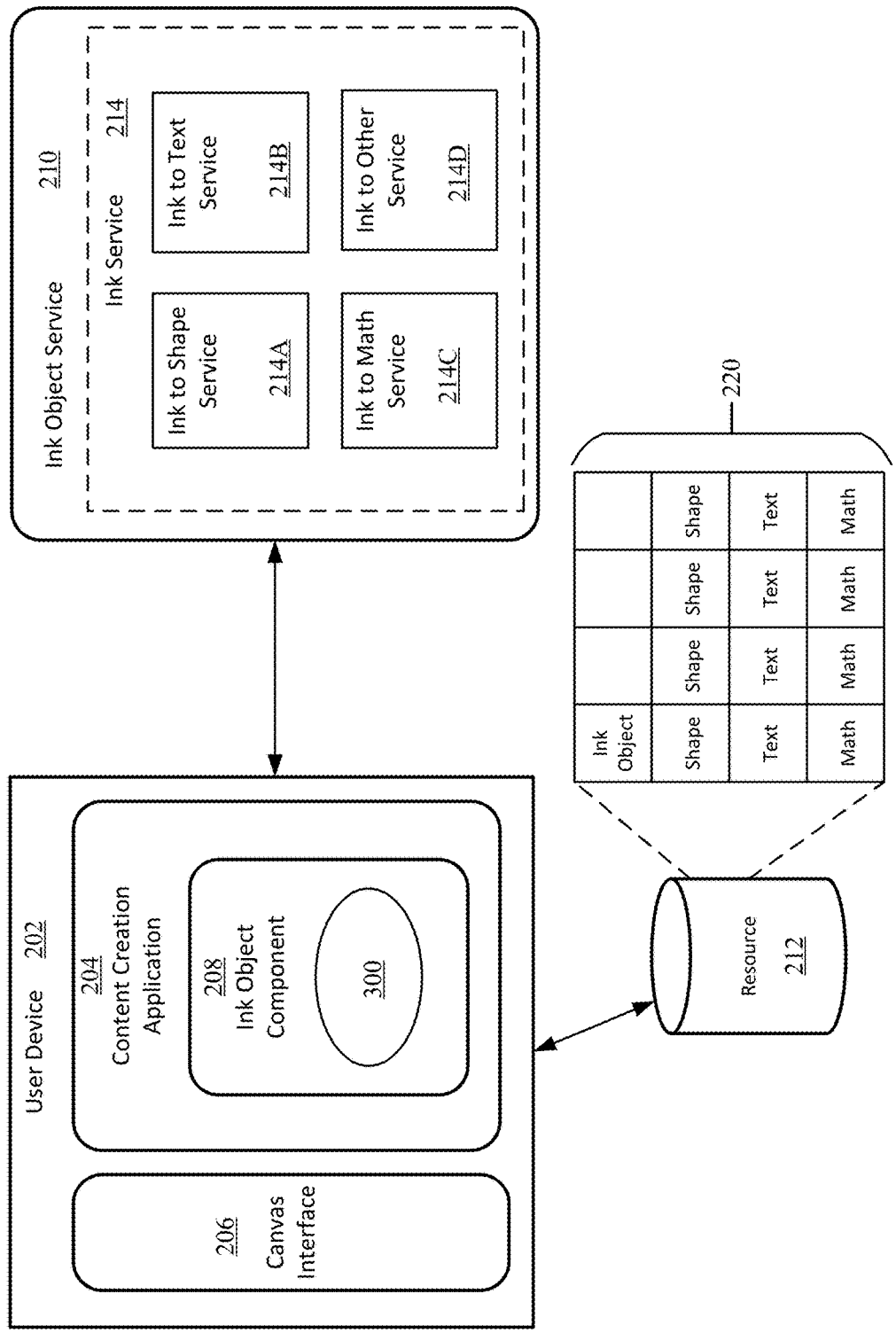
FIG. 2 illustrates an example operating environment in which various embodiments of the invention may be carried out.
Figure 3:
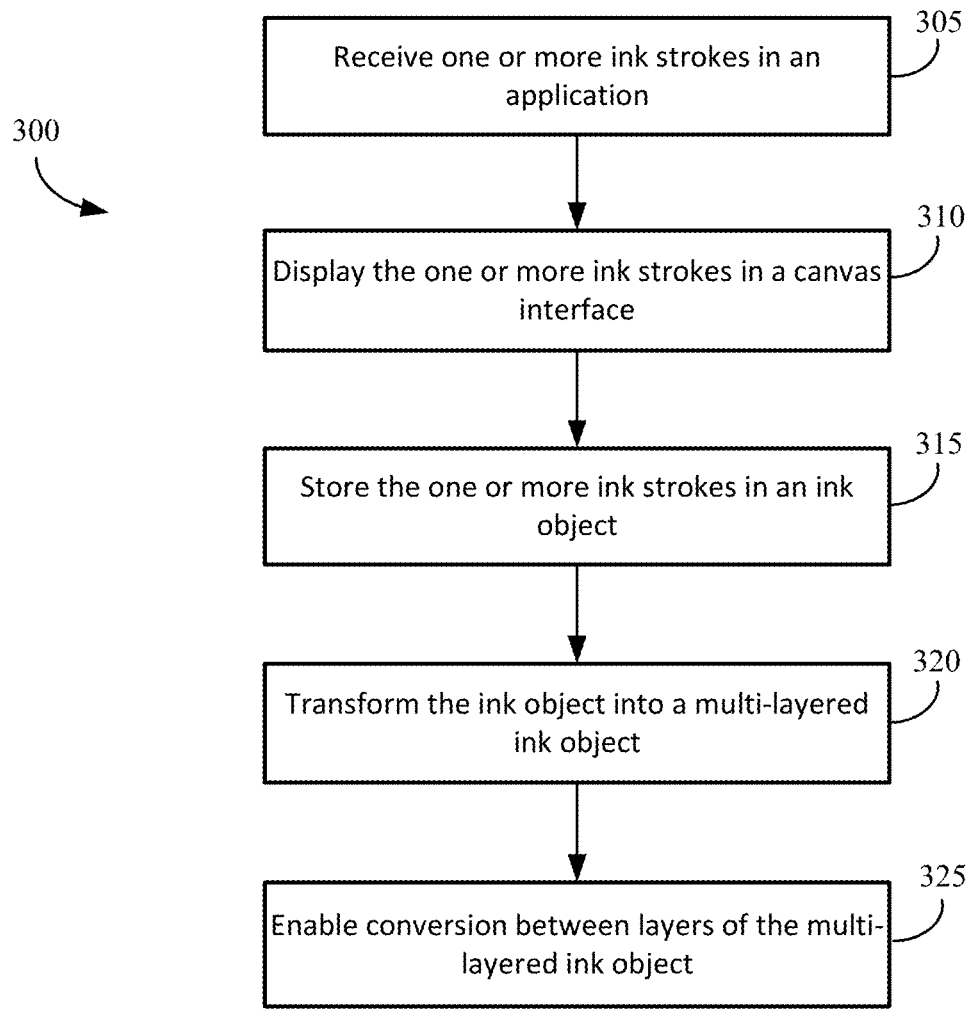
FIG. 3 illustrates an example process flow diagram of a method for providing multi-layered ink objects.

FIG. 2 illustrates an example operating environment in which various embodiments of the invention may be carried out; and FIG. 3 illustrates an example process flow diagram of a method for providing multi-layered ink objects.

Referring to FIG. 2, the example operating environment may include a user device 202 running a content creation application 204 with a content creation application canvas interface 206, an ink object component 208, an ink object service 210, one or more resources, such as resource 212, each of which may store data in structured, semi-structured, or unstructured formats, and one or more ink services 214, such as an ink to shape service 214A, an ink to text service 214B, an ink to math service 214C, and an ink to other service 214D.

Figure 15:
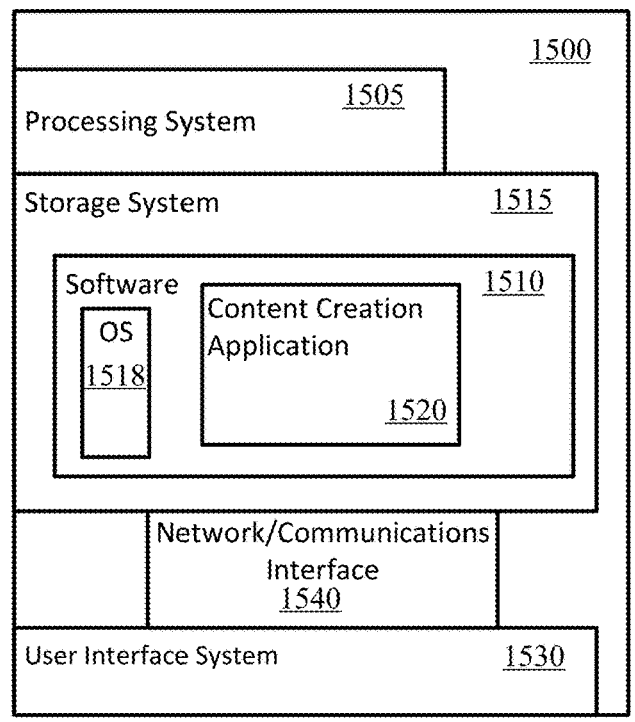
FIG. 15 illustrates components of a computing device that may be used in certain embodiments described herein.

User device 202 may be a computing device such as described with respect to system 1500 of FIG. 15. The user device 202 may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television. The ink object service 208 may be embodied as system 1600 such as described with respect to FIG. 16. In some cases, all or part of the ink object service 208 may be located at the user device 202.

The canvas interface 206 can refer to the graphical user interface through which content appears to be created, conceptually being a substrate for a work of authorship.

The resource 212 may contain a data structure, such as data structure 220, storing one or more multi-layered ink objects. In some cases, the resource 212 may be a local resource at the user device 202.

The ink object component 208 can be a standalone application providing a portal to the ink object service 210 or an ink object feature of the content creation application 204 to provide the functionality within the content creation application 204.

In some cases, the ink object service 210 can communicate with or be integrated with the one or more ink services 214. The one or more ink services 214 may be separate services operated by separate entities or by a same entity. In some cases, the one or more ink services 214 may be incorporated in the ink object component 208. The one or more ink services 214 may be ink recognition services and include recognition engines. For example, the ink to shape service 214A may include a shape recognition engine, the ink to text service 214B may include a text recognition engine, the ink to math service 214C may include a math recognition engine, and the ink to other service 214D may include another type of recognition engine.

In some cases, the content creation application 204 includes an ink analyzer (IA). In some cases, the content creation application 204 communicates with an external (to the content creation application 204 or even external to the user device 202) IA. In some cases, the IA may be incorporated into any of the one or more ink services 214.

Components (computing systems, storage resources, and the like) in the operating environment may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Communication to and from the components such as between the ink object component 208 and the ink object service 210 may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Referring to both FIG. 2 and FIG. 3, the content creation application 204 with ink object component 208 performing process 300 can be implemented by user device 202, which can be embodied as described with respect to computing system 1500 shown in FIG. 15.

The content creation application 204 can receive (305), for example via the canvas interface 206 of the content creation application 204, one or more ink strokes from a user. The ink strokes form inked content, for example, an inked term or an inked drawing handwritten to the canvas interface 206 by the user. The inked term may be, for example, a word, a phrase, a scientific term (e.g., a math term or a chemistry term), or other special notation and can include characters such as, letters, numbers, symbols, and punctuation. The content creation application 204 can display (310) the one or more ink strokes in the canvas interface 206 and store (315) the one or more ink strokes in an ink object.

In some cases, the one or more ink strokes can be identified as a grouping of ink strokes to be stored in the ink object by the content creation application 204, for example, through the IA. In some cases, the content creation application 204 may communicate the one or more ink strokes to a separate service, such as a separate IA or the ink object service 210, to determine the grouping of ink strokes.

The content creation application 204 (via the ink object component 208) can transform (320) the ink object into a multi-layered ink object. In some cases, the ink object may be automatically transformed into a multi-layered ink object when the user inputs the one or more ink strokes. In some cases, the ink object may be transformed into a multi-layered ink object upon selection (via, for example, a lasso tool or a tap gesture or via a ribbon) of the one or more ink strokes.

The content creation application 204 (via the ink object component 208) can transform (320) the ink object into a multi-layered ink object by obtaining content objects based on recognized entities of the ink object. In some cases, the content objects may be obtained by communicating the one or more ink strokes to the ink object server 210, which may include or communicate with the ink service, such as the ink service 214. Ink analysis can be used to recognize entities of the ink object and the recognized entities can be used to obtain corresponding content objects, which are provided to the ink object component 208.

A data structure, such as data structure 220, can be generated by the ink object component 208 to store the content objects associated with the ink object. The data structure can provide an association between the original one or more ink strokes with the obtained content objects. The data structure can allow for the ability of having multiple layers that expose, on the same ink object, multiple different alternates for that ink object. The generation of the data structure can be triggered by a first analysis/recognition effort. Then, multiple different alternates (layers) can be presented without having to do another analysis/recognition.

In some cases, the data structure may store multiple grouped ink objects. The multiple grouped ink objects have the ability to maintain group content objects while at the same time keeping their individual content objects.

In some cases, the data structure can store the ink object and the content objects. In some cases, the ink object data structure can include the generated data structure with the content objects. In some cases, the original ink object data structure can point to the generated data structure.

In some cases, access to the multiple layers of the multi-layered ink object may only be available while a user is interacting with the ink object. For example, if a user draws the word "hello" and then converts the drawn word to text, the multiple layers may be available until the user starts writing or drawing other content. In this case, the data structure may only live in a short-term memory (e.g., a local cache) and are not stored in a hard drive or other persistent memory.

In some cases, access to the multiple layers of the multi-layered ink object may only be available during a full inking session. For example, the multiple layers may only be available from the time user opened the file and initiated the conversion to the time the user closes the file. In some cases, the multiple layers of the multi-layered ink object may be available after an inking session has ended. In both of these cases, the file format may be modified to include the data structure so that the multiple layers may be carried around with the file for the life of the file or through a full inking session.

In some cases, context information can be obtained and used to enhance the multi-layered ink object. The context information can include, for example, user context information or context information of the application. The content objects can be formatted and optimized based on the context. In some cases, the content objects may be formatted and optimized before the data structure is generated. In some cases, the data structure may be generated and then updated with the formatted and optimized content objects.

In one example, when a user is working on a slide presentation, the content objects may be formatted based on the theme of the user's presentation. In another example, if a user is working in a presentation application, shapes may be more interesting to the user (and therefore ranked higher in results for content objects), or if a user is working on a spreadsheet, math may be more interesting (and therefore ranked higher in results for content objects).

In some cases, reformatting and optimizing the content objects based on context can save the user the extra step of having to reformat and recolor the converted object. The content objects could be presented to the user based on the information that can be inferred about the user's workflow. For example, not only can the user's handwriting be converted into text, but a version of that text can be presented that is determined to be a probable final version, as opposed to an intermediate version that the user needs to manipulate.

In some cases, the content objects may be ranked. In some cases, the content objects may be ranked based on the context information. For example, the user may be presented with the top five most likely content objects.

In some cases, the data structure can be updated in response to a manipulation being performed on content displayed in the content creation application 204. The content displayed can include the ink strokes or the content objects. In some cases, the data structure can be updated by changing at least one of the content objects and/or the ink object based on the manipulation. In some cases, the data structure can be updated by adding an additional ink object based on the manipulation and corresponding content objects to the data structure. In some cases, an additional call to the ink object service 210 may be made for an additional ink analysis/recognition.

In one example, if a user rotates or resizes a converted rectangle, updating the data structure includes rotating or resizing at least one of the content objects and/or the ink object in the data structure. In another example, if a user changes the color of displayed text from black to purple, updating the data structure includes changing the color of at least one of the content objects and/or the ink object from black to purple in the data structure. Manipulations to content will be further discussed with respect to FIGS. 9A-9C.

In some cases, a category may be determined for each of the content objects. The content objects can be stored associated with the determined category. The determined category may be, for example, text, shape, math, picture, or image.

Once the ink object has been transformed (320) into a multi-layered ink object, conversion between layers of the multi-layered ink object can be enabled (325). The conversion between the layers can be in response to a designated gesture and can include displaying, at the canvas interface 206, any of the content objects or the one or more ink strokes in the multi-layered ink object in place of the one or more ink strokes.

In some cases, the mechanism by which the user can convert between the layers of the multi-layered ink object can be a menu interface. The menu interface can be anything from an on-object user interface that shows up next to the original ink object and that changes its contents based on which content object the user has chosen to a panel where the user gets to navigate the multiple options and configurations. For example, the menu interface can include a contextual menu or a ribbon.

The menu interface may display the ink object and one or more of the content objects. In some cases, the menu interface may display preview icons of the ink object and the one or more content objects. In some cases, the menu interface may display a generic icon for the ink object and the one or more content objects.

In some cases, the menu interface may display the one or more content objects based on the determined category. When a first selection of one of the one or more content objects displayed in the menu interface is received as the designated gesture, the menu interface may then display one or more additional content objects stored in the generated data structure having a same category as the first selected content object. For example, writing an ink "O" could provide a menu interface displaying a content object for the letter "o", a content object for the number "0", a content object for the shape circle, etc. Moreover, once the first selection is made, access remains, and additional content objects are unveiled to the user. In this example, if the user chooses to convert the ink object to a circle, the user may then be presented with the alternates of different types and/or styles of ovals, circles or even rounded squares. During this whole process the user can also go back to the original ink object or another category. This conversion process and access to different layers can be repeated multiple times if the user so desires.

In an example of converting between layers of the multi-layered ink object, a first selection of one of the one or more content objects displayed in the menu interface may be received as the designated gesture. Then, the first selected content object from the generated data structure can be displayed in place of the one or more ink strokes in the canvas interface 206. Then, a second selection of one of the one or more content objects displayed in the menu interface as the designated gesture can be received, where the first selected content object is a different content object than the second selected content object. The second selected content object from the generated data structure can then be displayed in place of the first selected content object in the canvas interface 206.

A third selection of one of the one or more content objects displayed in the menu interface as the designated gesture can be received, where the third selected content object is the same content object as the first selected content object. The third selected content object from the generated data structure can be displayed in place of the second selected content object in the canvas interface 206.

In response to receiving a selection of the ink object displayed in the menu interface, the one or more ink strokes can be in place of the third selected content object.

FIGS. 4A-4F illustrate an example scenario of providing multi-layered ink objects. A user may open a canvas interface 405 of a content creation application 400 on their computing device (embodied, for example, as system 1500 described with respect to FIG. 15).

Figure 4A:
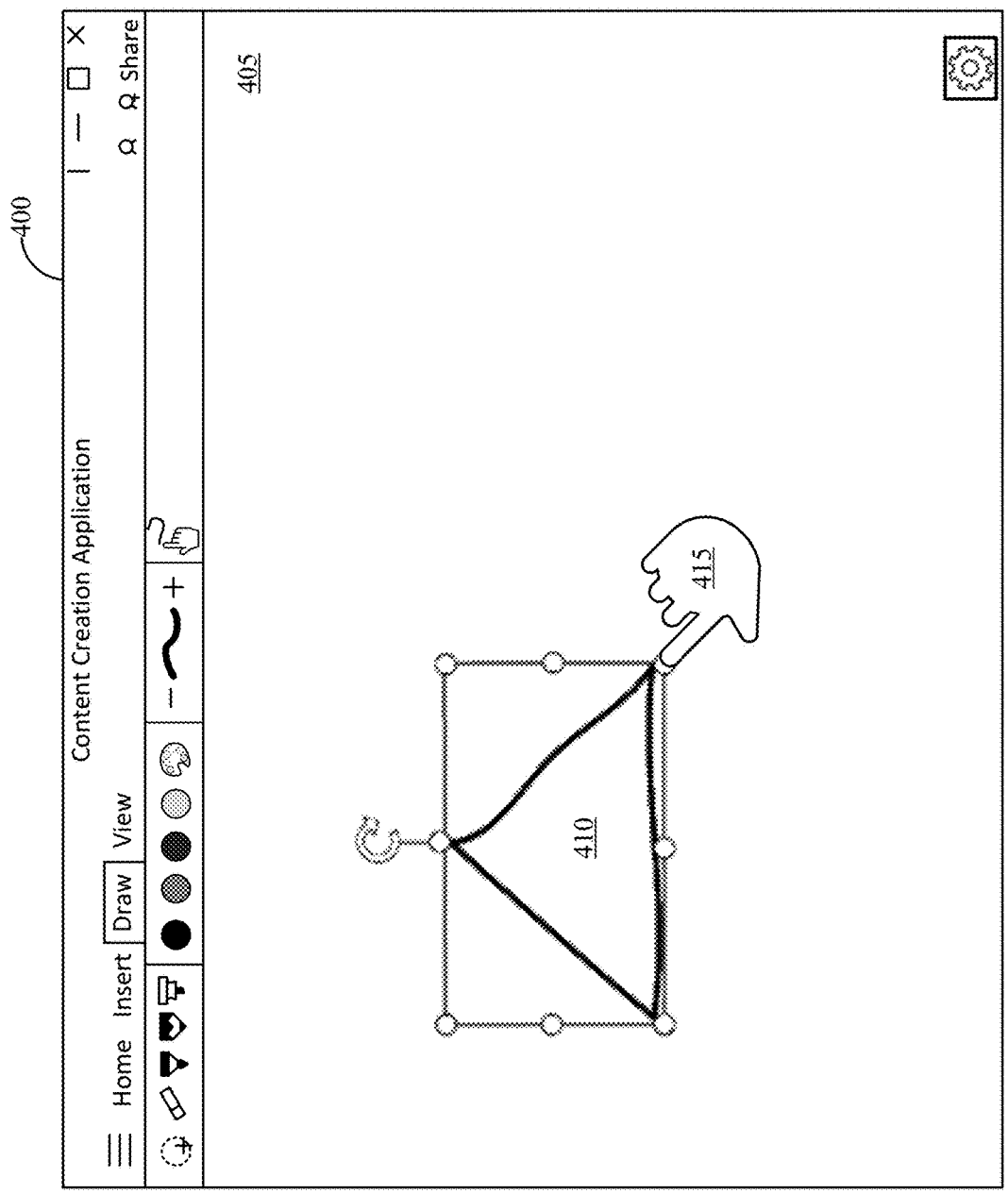

Referring to FIG. 4A, the user may input an inked triangle 410 onto the canvas interface 405 of the content creation application 400. The content creation application 400, (via, for example an ink object component) can receive the one or more ink strokes of the inked triangle 400 and display the one or more ink strokes in the canvas interface 405 of the content creation application 400. The one or more ink strokes can be stored in an ink object.

The user can select (415) the inked triangle 410 to initiate the ink object component of the content creation application 400. It should be understood that the ink object component of the content creation application 400 may be initiated by any suitable method—directly or indirectly performed by a user—and the illustration of FIG. 4A is meant to be illustrative of one mechanism to initiate the ink object component.

Figures 4B, 4C:
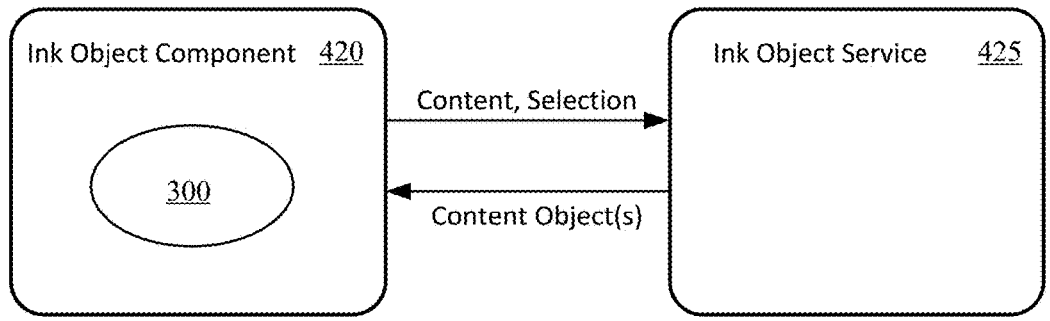

Referring to FIG. 4B, the ink object component 420, performing process 300 as described with respect to FIG. 3, can transform the ink object into a multi-layered ink object. The ink object component 420 can send the selection to an ink object service 425. As previously described, the selection can include, for example, the ink strokes of the inked triangle or the ink object storing the ink strokes of the inked triangle. In some cases, the entire document containing the ink strokes may be sent. The ink object service 425 can return content objects based on recognized entities of the ink object of the inked triangle.

Figure 4D:
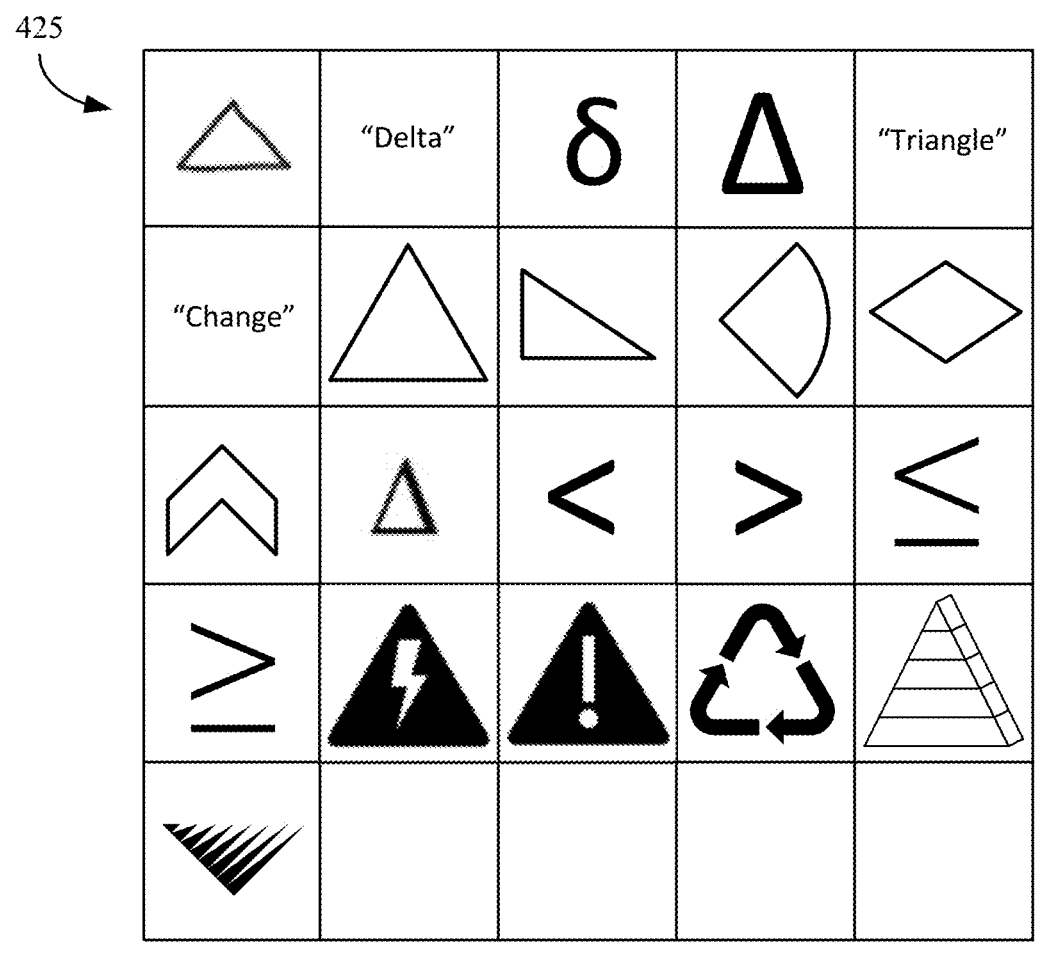

Once the ink object component 420 obtains the content objects, a data structure storing the content objects associated with the ink object can be generated, such as illustrated in FIGS. 4C and 4D. In some cases, the ink object and the one or more of the content objects are stored in the generated data structure.

FIG. 4C includes an example of a generated data structure 430 storing structured content objects. The generated data structure 430 includes the content objects stored associated with a determined category. In the generated data structure 430, the determined categories include "Ink Object," "Text," "Shape," "Math," and "Picture." Order of content objects in each category may be based on a ranking (e.g., determined relevance).

FIG. 4D includes an example of a generated data structure 435 storing non-structured content objects. In some cases, when the generated data structure stores non-structured content objects, the content objects may be ranked and presented to the user based on the ranking.

Figure 4E:
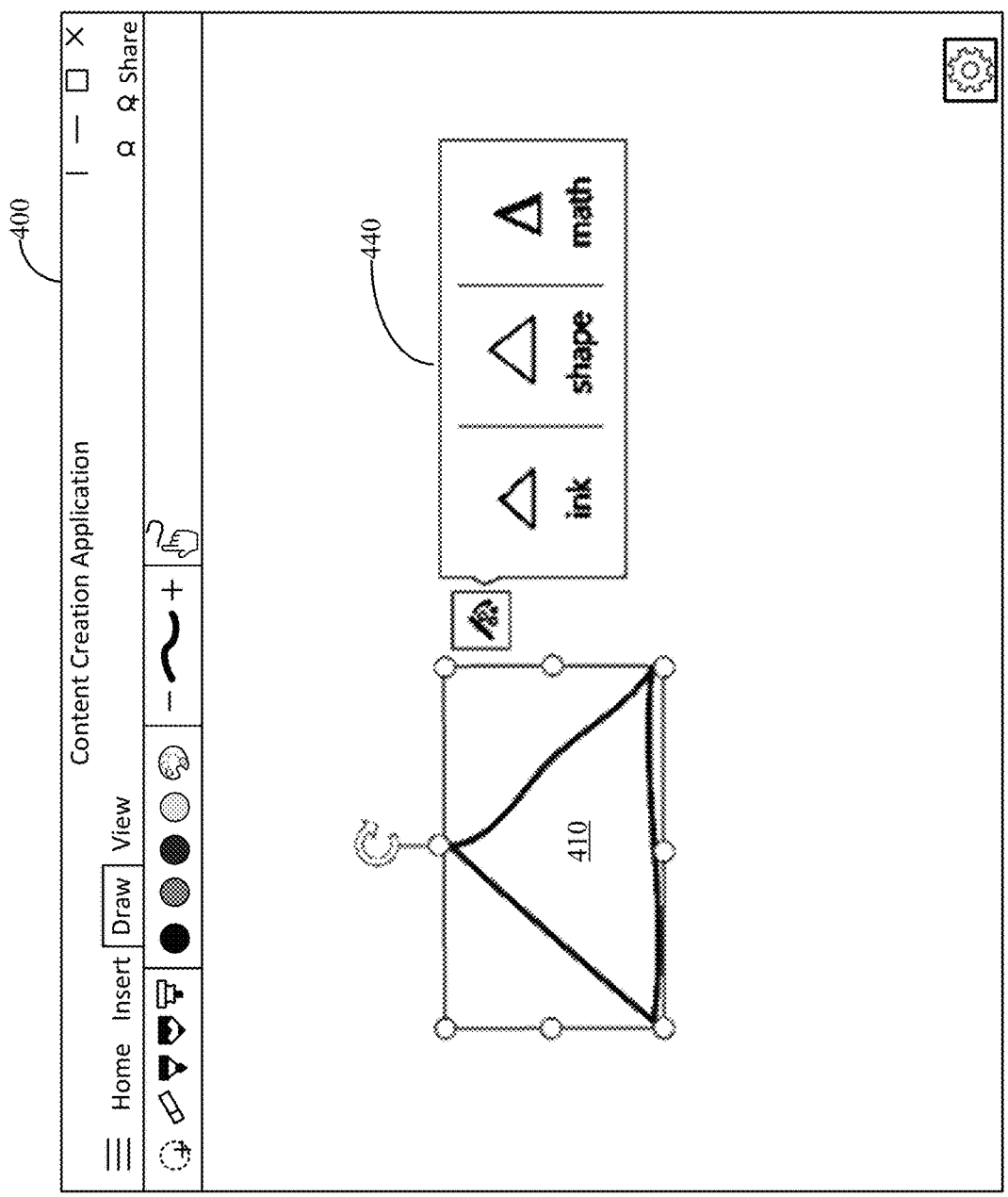

Referring to FIG. 4E, the ink object and one or more content objects may be displayed in a menu interface 440 in the content creation application 400. In the example of FIG. 4E, the ink object, the shape content object, and a math content object are presented to the user. The menu interface 440 can allow the inked triangle 410 to be converted to a shape or math.

Figure 4F:
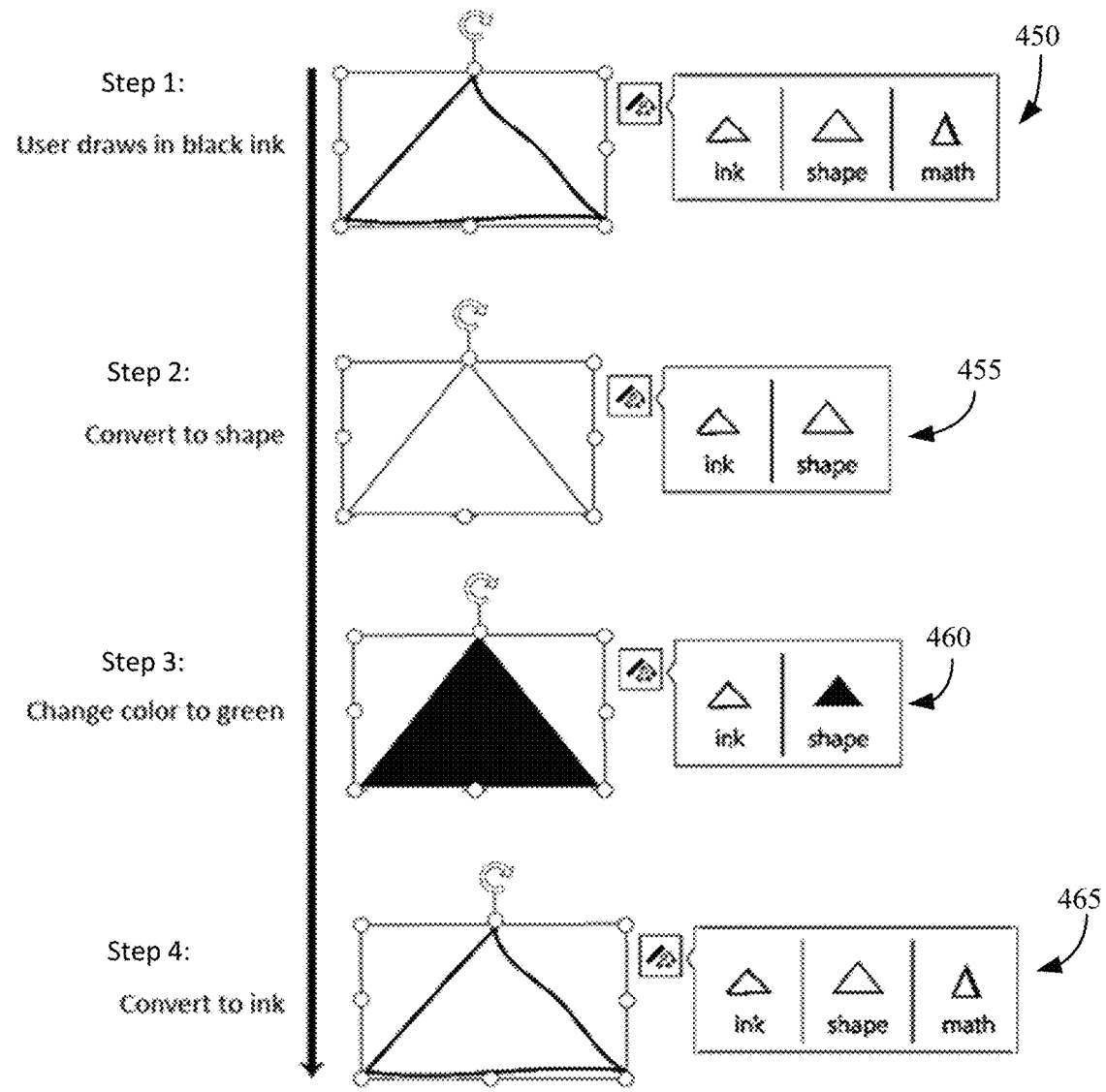

Referring to FIG. 4F, the user may convert between layers of the multi-layered ink object. Throughout Steps 1-4, the user maintains access to each layer of the multi-layered ink object.

At Step 1, the ink strokes of the inked triangle are displayed on the canvas interface and the menu interface 450 (e.g., menu interface 440 described in FIG. 4E) is displayed to the user. The user has access to the shape content object and the math content object.

At Step 2, the user has selected the shape content object and the ink strokes are converted to a shape. A menu interface 455 is presented to the user, displaying the ink object and the shape content object. In some cases, if the user selects the shape content object, additional content objects can be presented to the user. In some cases, the math content object remains available. Even after conversion to the shape content object, the user maintains access to the original ink object and the other content objects.

At Step 3, the user changes the color of the converted triangle shape to green. The data structure (e.g., data structure 430 as described in FIG. 4C or data structure 435 described in FIG. 4D) can be updated (and such updates may be reflected in the menu interface 460). In one case, the data structure can be updated by changing the color of one or more of the content objects to green. In one case, the data structure can be updated by adding a new ink object and corresponding content objects to the data structure with changes, or even by only adding additional content objects having the changes. A menu interface 460 is presented to the user displaying the original ink object and an updated content object. As described with the menu interface 455 in Step 2, the math content object may also be presented.

At Step 4, the user converts the updated content object back to the original ink strokes. A menu interface 465 is presented to the user displaying the ink object, the shape content object and the math content object. The menu interface 465 may be the same as the menu interface 450 presented in Step 1 and/or include the optional additional changed content objects.

FIGS. 5A-5G illustrate example menu interfaces for displaying an ink object and one or more content objects. Once an ink object has been transformed into a multi-layered ink object (as described in step 320 of process 300 referred to in FIG. 3), the ink object and one or more content objects can be displayed in a menu interface.

Figure 5A:
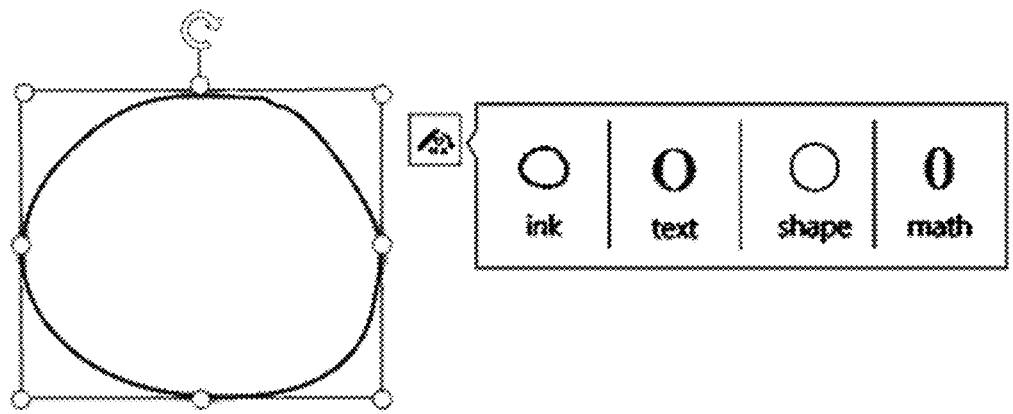
FIGS. 5A-5G illustrate example menu interfaces for displaying an ink object and one or more content objects.
Figure 5B:
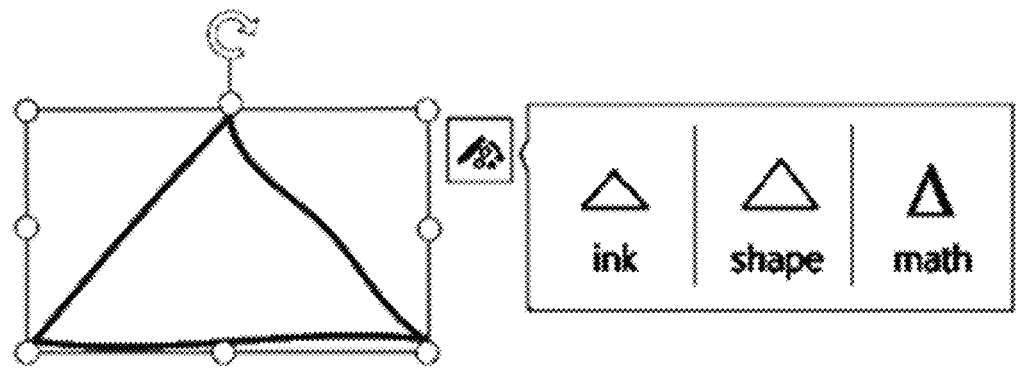
Figure 5C:
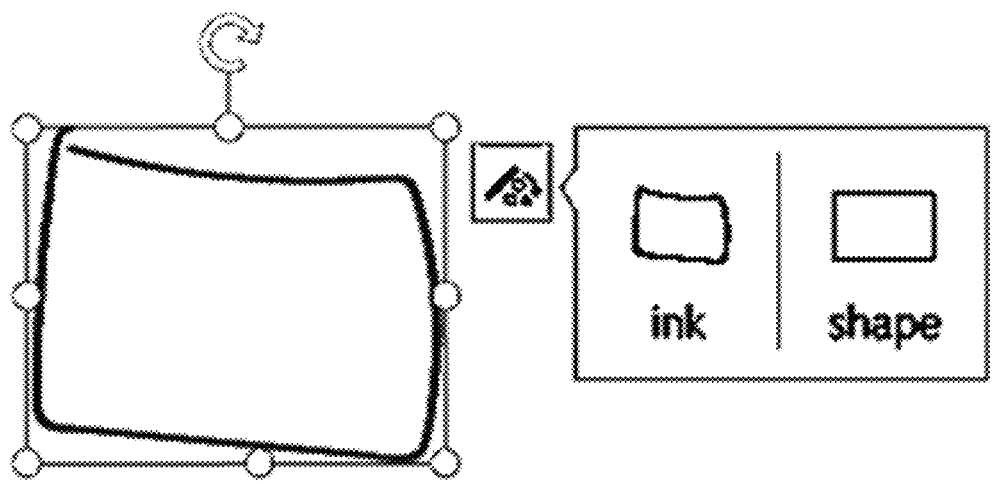

FIG. 5A shows an example menu interface for an inked circle. In this case, the menu interface includes the ink object, a text content object, a shape content object, and a math content object. FIG. 5B shows an example menu interface for an inked triangle. In this case, the menu interface includes the ink object, a shape content object, and a math content object. FIG. 5C shows an example menu interface for an inked rectangle. In this case, the menu interface includes the ink object, and a shape content object.

Figure 5D:

FIG. 5D shows an example menu interface for a converted text word "Delta" converted from an inked word "Delta." In this case, the menu interface includes the ink object and multiple text content objects. The text content objects may be presented to the user in response to the user selecting to convert the inked word to text.

In some cases, once text content objects are received by an ink object component, the ink object component may pull similar words, synonyms, or antonyms for the received text content object. The similar words, synonyms, and antonyms may be stored in the data structures associated with the ink object. In this case, content objects are categorized based on content type. Therefore, if the user selects a text content object, additional text content objects may be presented to the user.

Figure 5E:
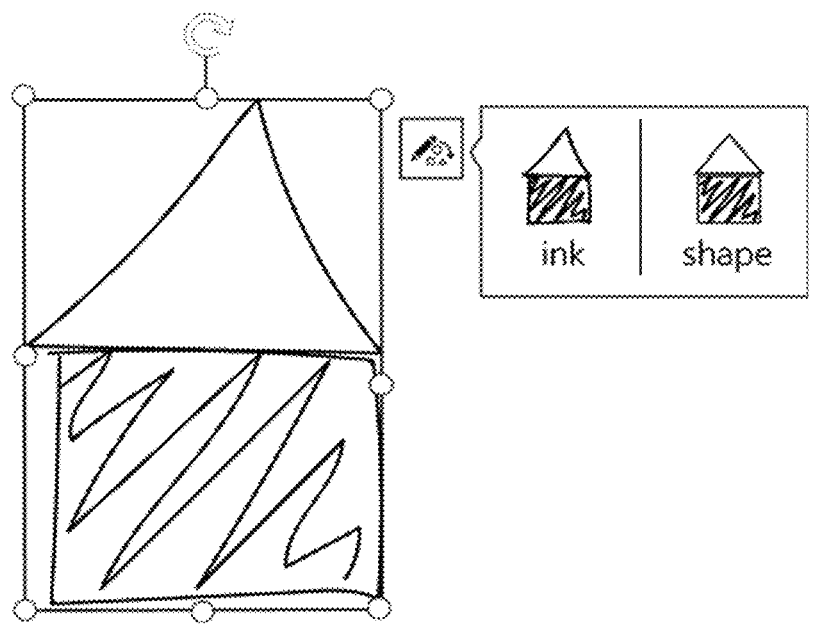
Figure 5F:
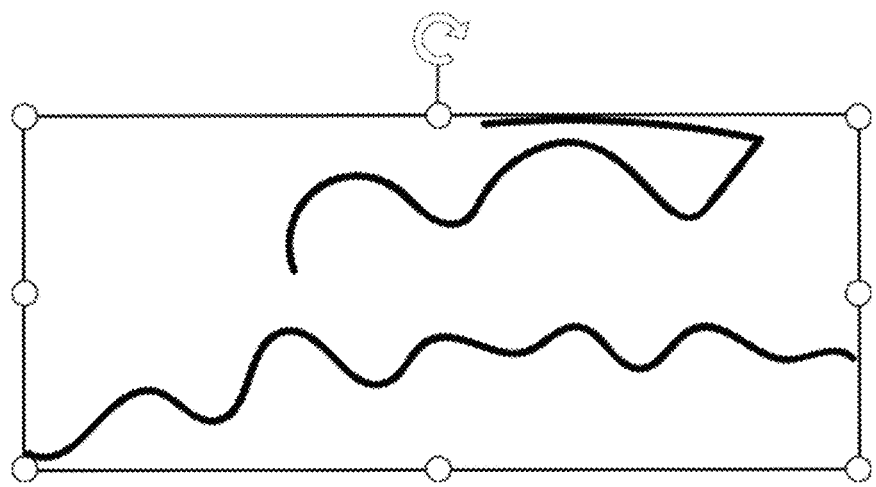

Referring to FIG. 5E and FIG. 5F, a user may select ink that may not be recognizable (e.g., the ink object service may not be able to return a result from any recognition engines). In some cases, the ink may be partially or fully unidentifiable by the ink object service. If the ink may be partially unidentifiable, the content that can be recognized by a recognition engine can be converted and the unidentifiable ink can be left as ink.

The ink drawn in FIG. 5E shows ink that is partially unidentifiable. In the example of FIG. 5E, a user has drawn a house that includes a triangle and a partially filled in square. In this case, a content object includes recognized shapes for the triangle and the square, with the square shape remaining partially filled in. This content object is presented through the menu interface.

In some cases, the ink object service could recognize that the user is trying to color in the square and present a content object having a triangle and a fully filled in square.

The ink drawn in FIG. 5F shows ink that is fully unidentifiable. In the example of FIG. 5F, a user has drawn wavy lines. Since none of the ink can be identified, the user is not presented with a menu interface.

Figure 5G:
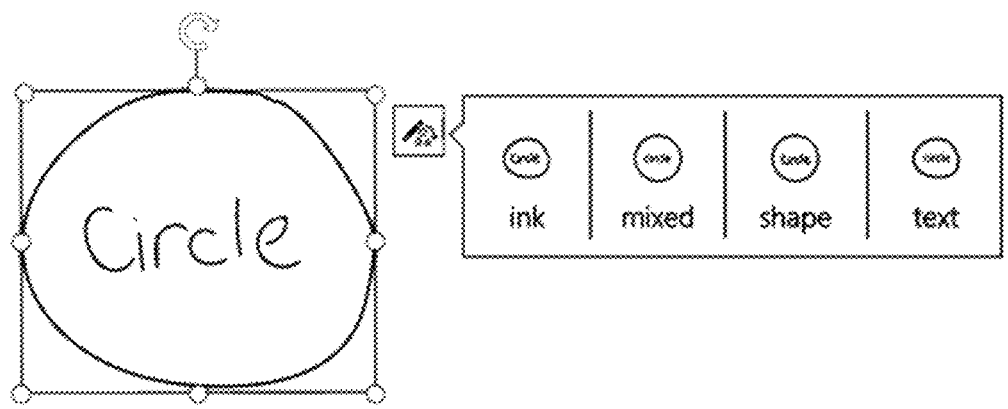

Referring to FIG. 5G, a user may select ink with mixed content to be converted. The mixed content may be a combination of, for example, a shape, text, or a number. In the example of FIG. 5G, the selected ink includes a circle, which can be recognized as a shape and the word "circle," which can be recognized as text. The content objects presented to the user in the menu interface may include the ink object, a mixed content object (e.g., where both the shape and the text are converted), a shape content item (e.g., where the shape is converted and the text remains as ink), and a text content item (e.g., where the text is converted and the shape remains as ink).

FIGS. 6A-6E illustrate example scenarios of providing multi-layered ink objects for multiple ink representations. In the illustrated example scenarios of FIGS. 6A-6E, a user has drawn three different inked shapes, including a square, a triangle, and a circle. The ink strokes of each inked shape can be stored in an ink object.

Figure 6A:
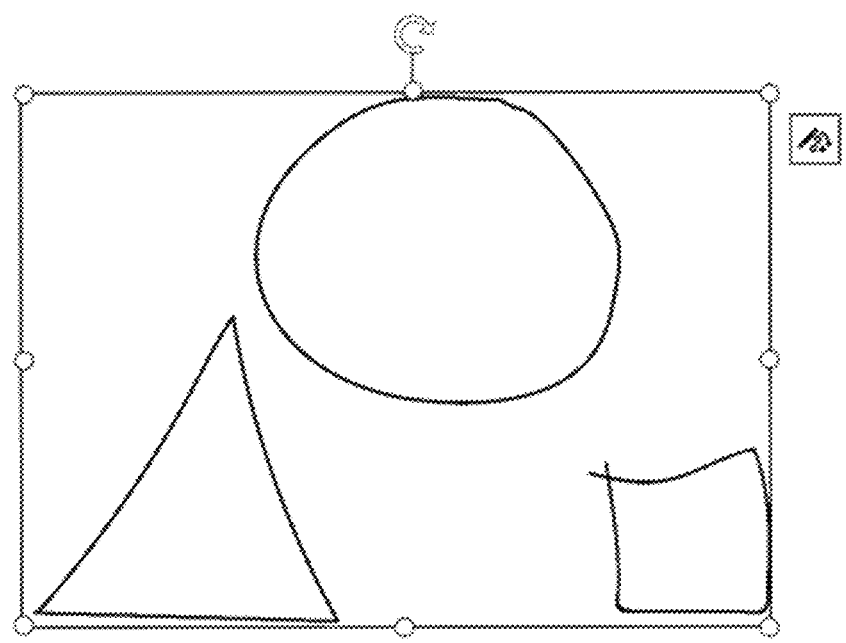
FIGS. 6A-6E illustrate example scenarios of providing multi-layered ink objects for multiple ink representations.
Figure 6B:

Referring to FIG. 6A and FIG. 6B, the user can select the three different inked shapes in one selection, as shown in FIG. 6A. Upon selection, each ink object (e.g., the inked circle ink object, the inked triangle ink object, and the inked square ink object) can be separately transformed into a corresponding multi-layer ink object or a combined multi-layered ink object by obtaining content objects based on recognized entities of each of the ink objects and generating a data structure storing the content objects associated with the corresponding ink object.

In some case, the data structure can be generated the same way (e.g., as a combined multi-layered ink object) no matter the number of ink objects and/or content objects. For example, the generated data structure, as shown in FIG. 6B, includes all three ink objects and the corresponding content objects obtained for each ink object. In some cases, the means for presenting the layers to a user can then be optimized by using a single multi-layered ink object. Advantageously, including all three ink objects and the corresponding content objects into a single multi-layered ink object allows the multiple layers to be shown at a group level and/or on an individual level.

Figure 6C:
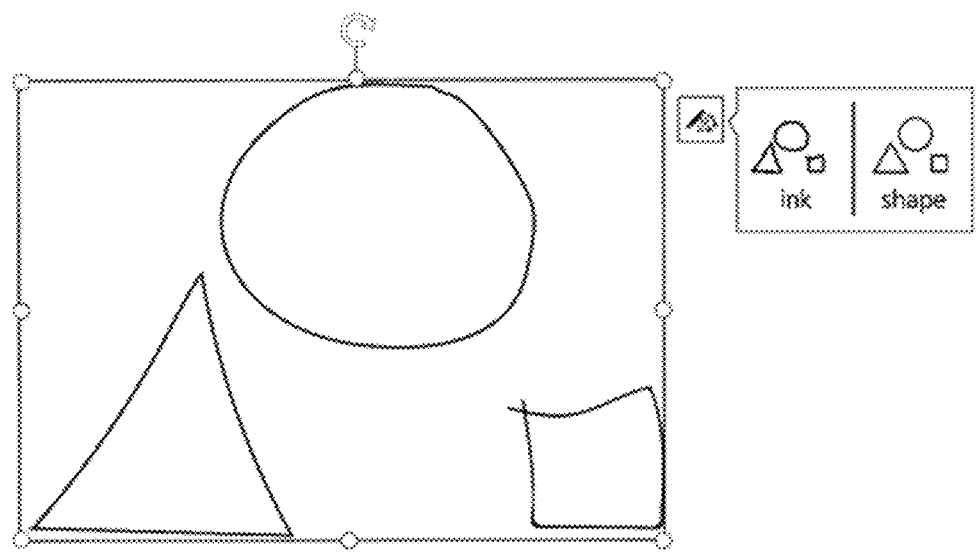

Referring to FIG. 6C, once the ink objects of the three inked shapes are transformed into multi-layered ink objects, a menu interface can be presented to the user to allow access to the multi-layered ink objects.

In the example of FIG. 6C, the layers are presented to the user at a group level. The menu interface includes a group ink object showing all three inked shapes and a group content object showing a shape for all three inked shapes. If the group content object is selected, the ink strokes of all three inked shapes will be converted to shapes. In some cases, when multiple inked shapes are converted, the z-order of the shapes do not change.

Figure 6D:
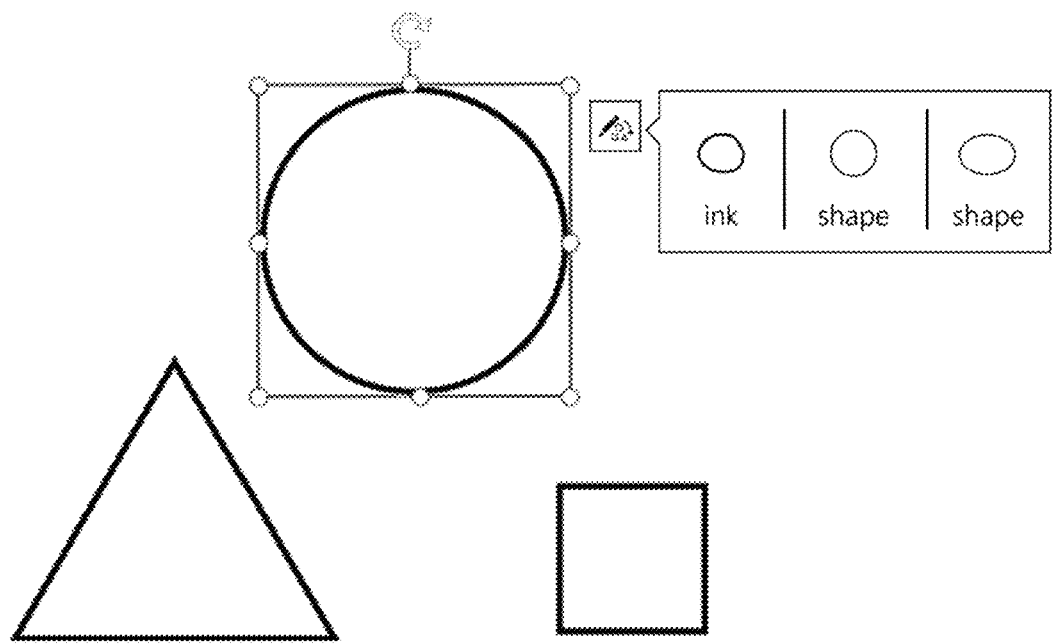
Figure 6E:
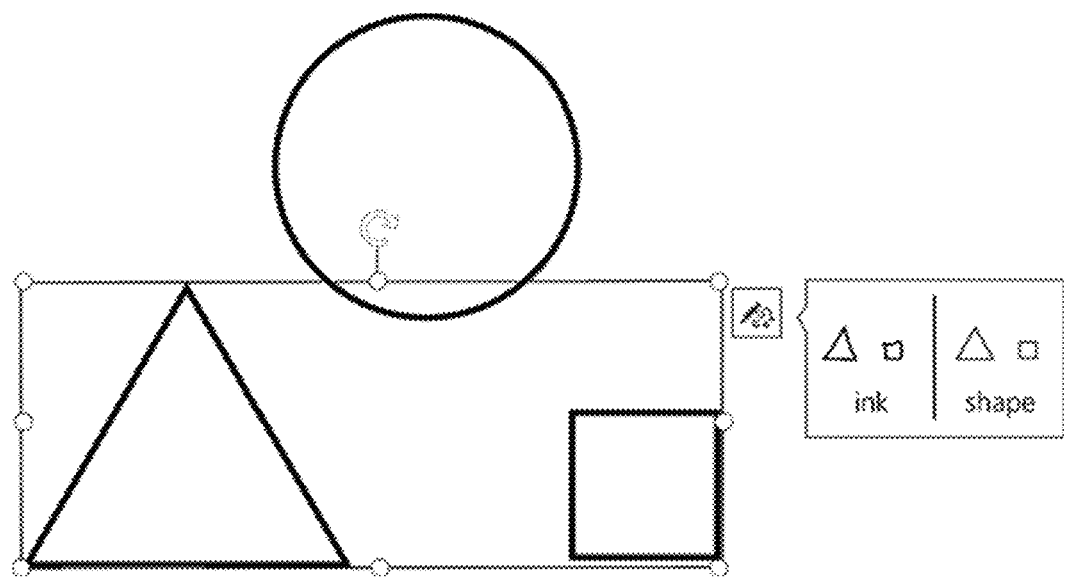

Referring to FIG. 6D and FIG. 6E, once a group of inked shapes have been converted, access to the layers for each shape can be provided individually or as a subset. That is, each shape can be further converted, or even converted back to ink, individually or as a subset.

In the example of FIG. 6D, the circle is selected, and a menu interface providing access to the layers is presented. Since only the circle is selected, the layers are shown at an individual level. The layers presented to the user in the menu interface can include multiple content objects with the same content type (e.g., multiple content objects for a shape, such as circle and an oval) or multiple content objects with different content types (e.g., a content object for a shape, a content object for text, and a content object for math).

The menu interface presented in FIG. 6D includes the ink object for the inked circle, a content object for a circle, and a content object for an oval. In this case, the user can convert the displayed circle to an oval or back to the inked circle.

Providing multiple content objects with the same content type can allow for more control over the conversion.

In the example of FIG. 6E, both the triangle and the square are selected as a subset, and a menu interface providing access to the multiple layers at a group level is presented. The menu interface includes an ink object for both the inked triangle and the inked square, and a content object for the triangle and square. In this case, the user can convert both the displayed triangle and square back to the inked triangle and the inked square with the selection of the group ink object.

In some cases, additional content objects may be displayed to the user. For example, the menu interface may display grouped content objects with different permutations of the stored content objects for the triangle and square.

Figure 7:
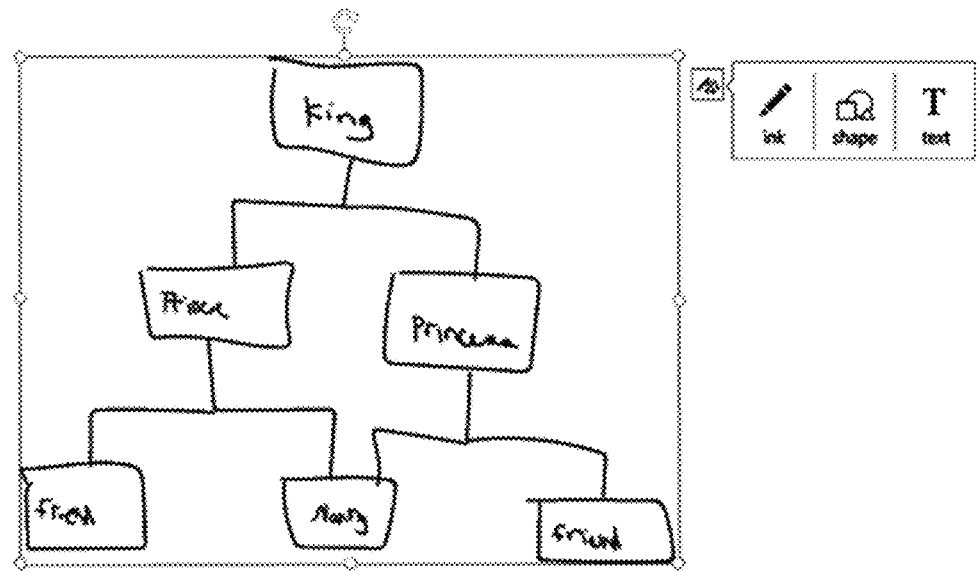
FIG. 7 illustrates an example scenario of providing multi-layered ink objects where a user selects a complex set of ink strokes.

FIG. 7 illustrates an example scenario of providing multi-layered ink objects where a user selects a complex set of ink strokes. Referring to FIG. 7, the user selects a complex set of ink strokes that represent a diagram.

An ink selection may be complex in cases where the ink selection satisfies one or more conditions. The conditions may include, but are not limited to, the ink selection returns more than a threshold number of separate shapes, the ink selection returns more than one textbox as a text result, or the ink selection returns more than a threshold number of words in a single text box. For example, an ink selection may be considered complex if the ink selection returns more than four separate shapes, the ink selection returns more than one textbox as a text result, or the ink selection returns more than two words in a single text box.

Upon selection of the complex ink strokes, each ink object identified in the selection can be transformed into a multi-layer ink object by obtaining content objects based on recognized entities of each of the ink objects and generating a data structure storing the content objects associated with the corresponding ink object. As previously described, in some cases, the data structure can be generated the same way no matter the number of ink objects and/or content objects and the means for presenting the layers to a user can then be optimized.

Once the ink objects are transformed into multi-layered ink objects, a menu interface can be presented to the user to allow access to the multi-layered ink objects. In this case, the menu interface can present generic icons instead of preview icons showing a preview of the ink object and the content object.

Figure 8A:
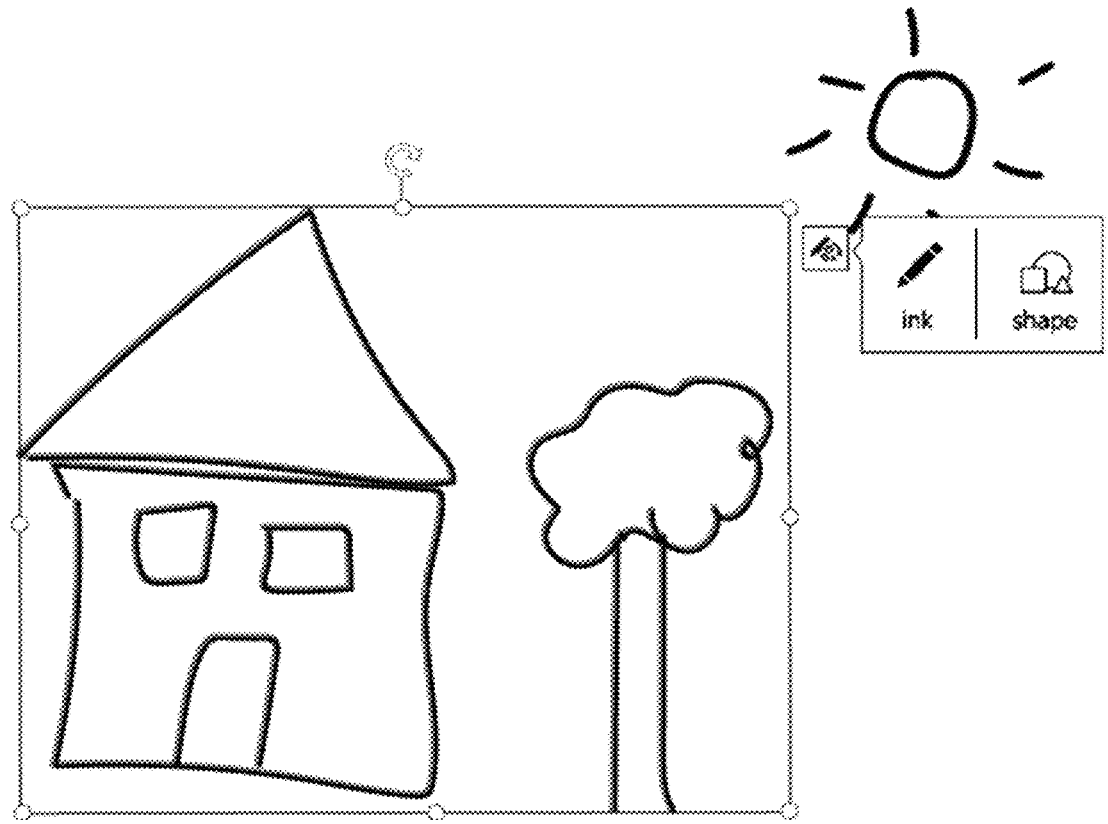
FIGS. 8A-8C illustrate example scenarios of providing multi-layered ink objects for multiple ink representations.
Figure 8B:
Figure 8C:
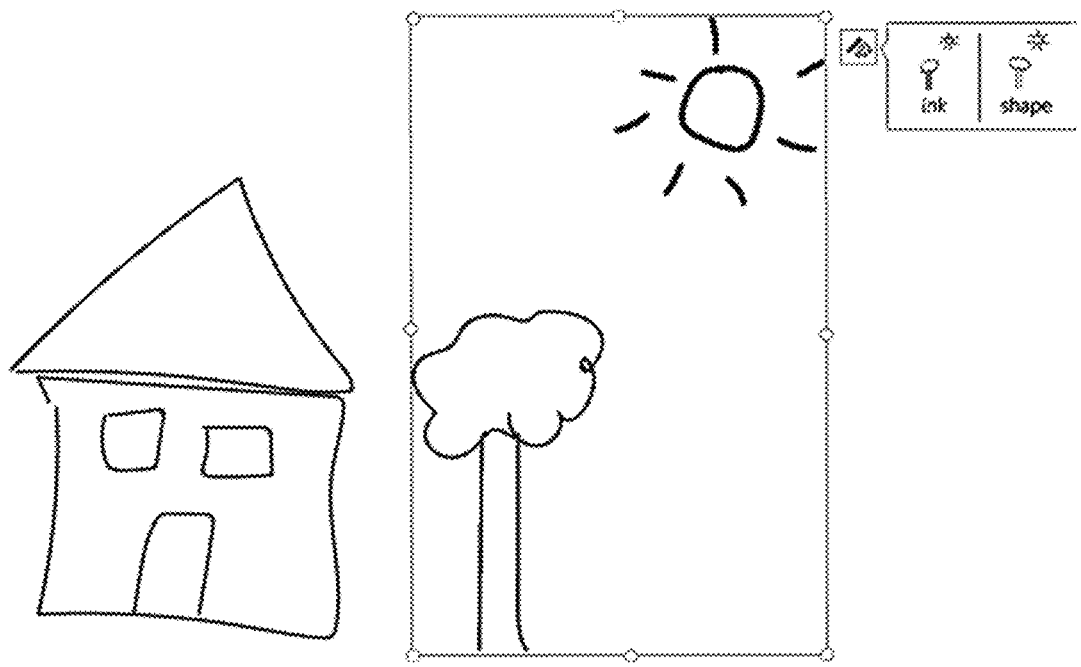

FIGS. 8A-8C illustrate example scenarios of providing multi-layered ink objects for multiple ink representations. In the illustrated example scenarios of FIGS. 8A-8C, a user has drawn a house, a tree, and a sun, each having multiple ink strokes. The ink strokes can be grouped in many ways and stored in one or more ink objects. In one example, all the ink strokes may be grouped into one ink object. In another example, the ink strokes for the house may be grouped and stored in an ink object, the ink strokes for the tree may be grouped and stored in an ink object, and the ink strokes for the sun may be grouped and stored in an ink object. In yet another example, each separate shape can be grouped and stored in separate ink objects. The ink strokes may also be grouped in any combination of the above examples.

Referring to FIG. 8A, the user can select the ink strokes representing the house and the tree as one selection. Upon transformation of the one or more ink objects into multi-layered ink objects, a menu interface can be presented to the user to allow access to the multi-layered ink objects. Like FIG. 7, the ink selection of FIG. 8A is a complex selection and the menu interface may present generic icons instead of preview icons showing a preview of the ink object and the content object.

Referring to FIG. 8B, the user can select the ink strokes representing the house as one selection. Upon transformation of the one or more ink objects into multi-layered ink objects, a menu interface can be presented to the user to allow access to the multi-layered ink objects. If each individual shape of the house was grouped as a separate ink object, the layers are presented to the user at a group level. In this case, the menu interface includes a group ink object showing all inked shapes of the house and a group content object showing a shape for the house. If the group content object is selected, the ink strokes of inked shapes in the house will be converted to shapes.

If all the inked shapes of the house were grouped as one ink object, the layers of the multi-layered ink object are presented to the user based on the house. In this case, the menu interface includes the ink object and a content object showing a shape for the house.

In the example of FIG. 8C, the user can select the ink strokes representing the tree and the sun as one selection. Upon transformation of the one or more ink objects into multi-layered ink objects, a menu interface can be presented to the user to allow access to the layers of the multi-layered ink objects.

Of course, additional content objects may be displayed to the user. For example, the menu interface may display grouped content objects with different permutations of the stored content objects for the triangle and square.

Figure 9A:
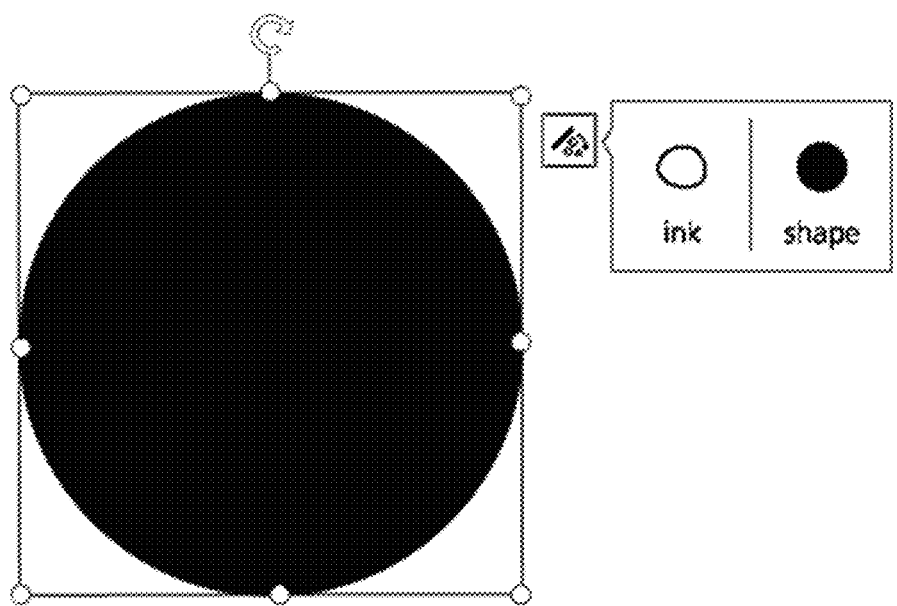
FIGS. 9A-9C illustrate example scenarios of providing multi-layered ink objects where one or more manipulations are performed.
Figure 9B:
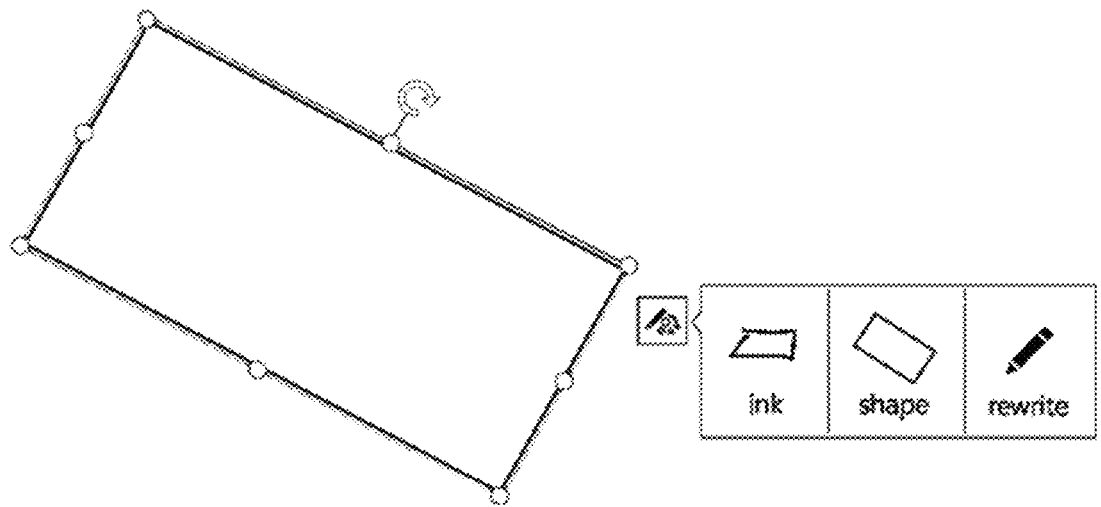
Figure 9C:
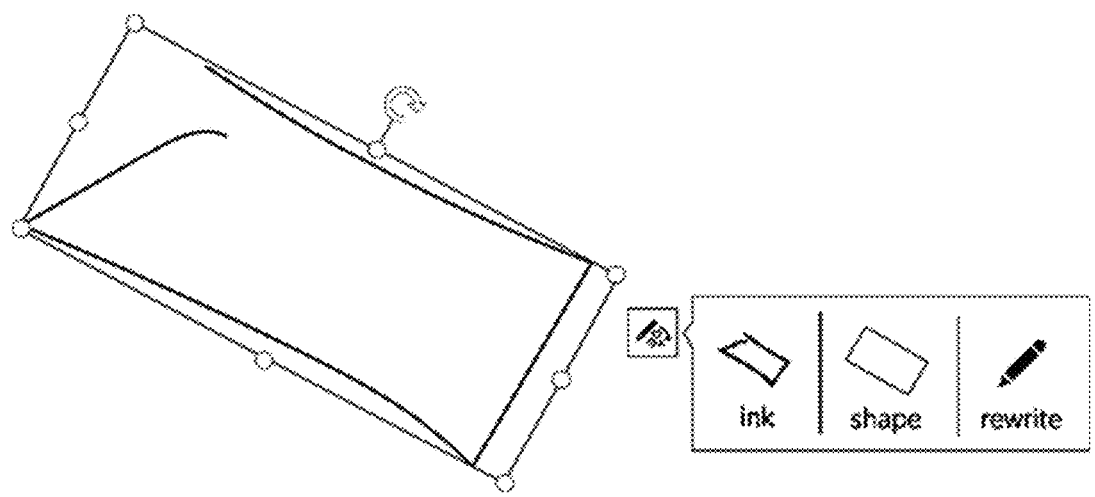

FIGS. 9A-9C illustrate example scenarios of providing multi-layered ink objects where one or more manipulations are performed. The displayed object, whether the ink object (e.g., the ink strokes) or a content object, may be manipulated. A manipulation may include, for example, a color change or a formatting change, such as a rotation or a resize. When a manipulation is performed, a generated data structure storing content objects associated with the ink object, as well as the ink object, can be updated based on the performed manipulation.

The generated data structure may be updated in various ways. In one example, the object currently displayed is updated to reflect the performed manipulation. In another example, all stored content objects and ink objects are updated to reflect the performed manipulation. In yet another example, new layers (content objects and ink objects) can be added to the data structure to reflect the performed manipulations. In this case, access to the original ink object (and content objects) may be maintained.

In one case, when ink formatting is changed for one or more ink strokes, the change may be reflected across all content objects. For example, if a user writes with red ink, all layers presented to the user may also be red, such as a red shape, red text, etc.

In one case, when a user edits a piece of converted content (e.g., a displayed content object), the ink object presented to the user may always look like the original ink. In some cases, if a user cycles between the ink object and the content objects, the formatting may be retained. In some cases, once the user converts back to the ink strokes, the added formatting may be lost.

In one case, if a user changes the outline color for a converted shape (e.g., a content object), the ink object looks like original ink object, but other content objects retain the formatting performed.

In cases where a user converts ink to text and then changes the text formatting, if the user converts back to the ink, the ink strokes displayed will be the from the original ink object stored in the data structure.

Referring to FIG. 9A, a user may change a fill color for converted shape. The data structure may be updated by changing at least one of the content objects to the same color of the fill color change. For example, the ink object presented to the user is the original ink object and the content object presented to the user retains the fill color change.

Referring to FIG. 9B, a user may resize or rotate a converted shape. In the illustrated example, one or more content objects can be updated based on the resizing or rotations and presented to the user reflecting the change. In some cases, the ink object is not updated, and the ink object presented to the user is the original ink object. Thus, in such a case, if the user converts back to ink, the original ink strokes will be displayed.

Referring to FIG. 9C, a user may resize or rotate a displayed ink object. in the illustrated example, both the ink object and the corresponding content objects may be updated to reflect the change or a new ink object, and corresponding contents, reflecting the change may be added to the data structure. For example, the ink object and any content objects presented to the user reflect the change.

It should be understood that the examples described herein are for illustrative purposes and are not the only ways to update the generated data structures or present the layers to the user.

Figure 10A:
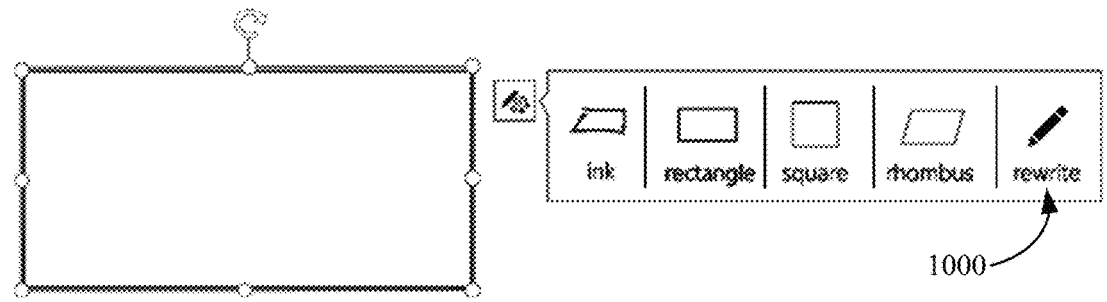
FIG. 10A illustrates an example scenario of providing multi-layered ink objects where the ability to redraw shapes is provided.
Figure 10B:
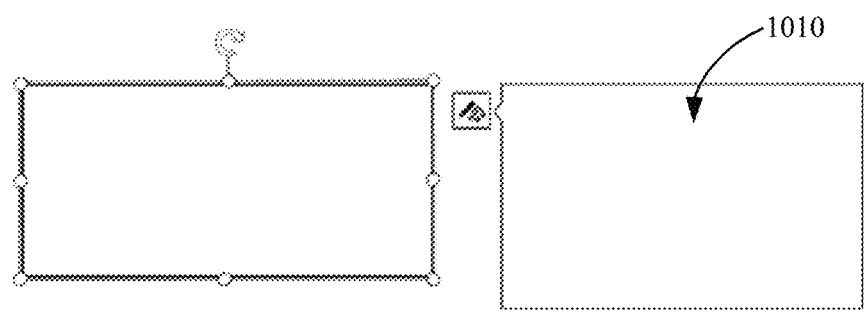
FIG. 10B illustrates an example menu interface providing a rewrite area.

FIG. 10A illustrates an example scenario of providing multi-layered ink objects where the ability to redraw shapes is provided; FIG. 10B illustrates an example menu interface providing a rewrite area; and FIG. 10C illustrates an example scenario of providing multi-layered ink objects where a shape is redrawn.

Referring to FIG. 10A, in addition to presenting an ink object and one or more content objects through a menu interface, a rewrite option 1000 may be provided. The rewrite option 1000 may be presented to a user to allow incorrect conversions to be fixed. In the example of FIG. 10A, a user may choose to redraw a previously drawn rectangle by selecting the rewrite option 1000 provided in the menu interface.

Referring to FIG. 10B, when the user selects the rewrite option, a rewrite area 1010 may be provided to the user. In some cases, the rewrite area 1010 is the size of the original ink drawing. In this example, the rewrite area 1010 is part of the menu. However, in some cases, the rewrite area may be directly on the canvas.

Figure 10C:
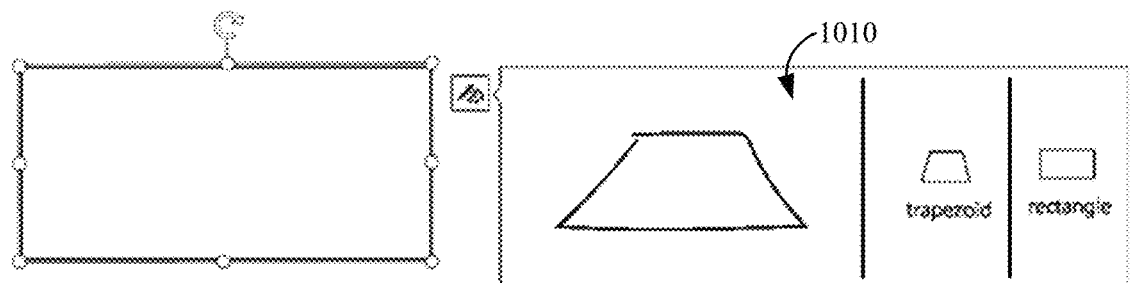
FIG. 10C illustrates an example scenario of providing multi-layered ink objects where a shape is redrawn.

Referring to FIG. 10C, when the user inputs ink strokes to the rewrite area 1010, an ink object for the new ink strokes can be transformed into a multi-layered ink object or the prior multi-layered ink object data structure updated/replaced. For example, a data structure storing the content objects associated with the ink object may be updated. In one case, the update to the data structure includes replacing the ink object stored in the data structure, as well as the corresponding associated content objects. In this case, the user may not be able to convert back to the original ink strokes in the original ink object.

In another case, the update to the data structure includes adding an ink object for the redrawn ink strokes to the data structure, as well as additional content objects based on the new ink object. In both cases, an additional call to an ink object service may be made to obtain the updated content objects.

Once the newly created ink object is transformed to a multi-layered ink object, the ink object and one or more content objects may be presented the user. In some cases, the transformation is performed automatically, and the one or more content objects may appear as the user draws in the rewrite area.

In the example of FIG. 10C, when the user draws a trapezoid in the rewrite area 1010, content objects, such as a trapezoid shape content object and a rectangle shape content object, are presented associated the newly drawn trapezoid.

Figure 11A:
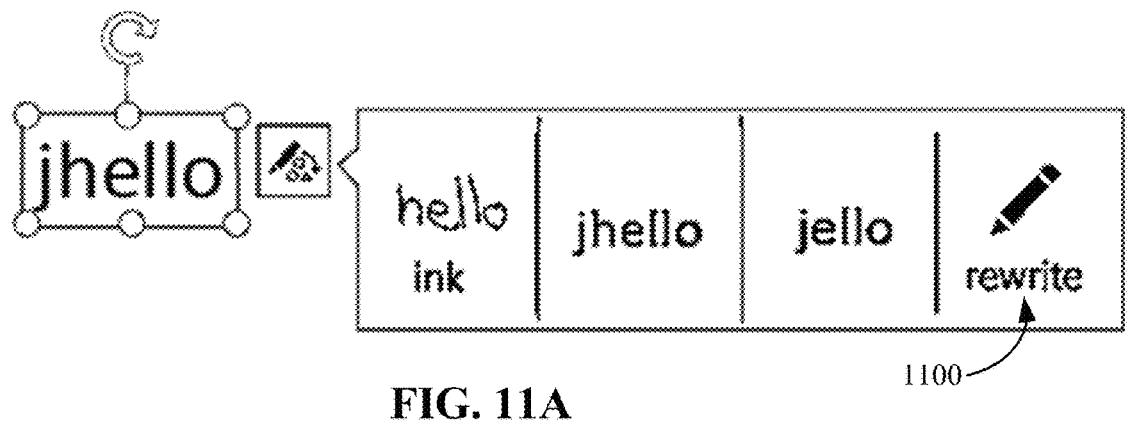
FIG. 11A illustrates an example scenario of providing multi-layered ink objects where the ability to rewrite text is provided.
Figure 11B:
FIG. 11B illustrates an example scenario of providing multi-layered ink objects where text is rewritten.

FIGS. 11A, 11B, 12A, 12B, 13A, and 13B illustrate additional examples of allowing a user to rewrite content, such as a shape, text, or math equation. FIG. 11A illustrates an example scenario of providing multi-layered ink objects where the ability to rewrite text is provided; and FIG. 11B illustrates an example scenario of providing multi-layered ink objects where text is rewritten.

Referring to FIG. 11A, a user may choose to redraw a previously written word by selecting a rewrite option 1100 provided in the menu interface. In this example, the user intended to write the word "hello." However, the user's handwriting may not have been clear and an ink analysis, including ink recognition, performed on the ink instead provided the word "jhello." Referring to FIG. 11B, to fix the incorrect conversion, the user can more clearly write the word "hello" in a rewrite area 1110. Content objects based on the newly written ink can then be presented. In this example, the rewrite area 1110 is part of the menu. However, in some cases, the rewrite area may be directly on the canvas.

Figure 12A:
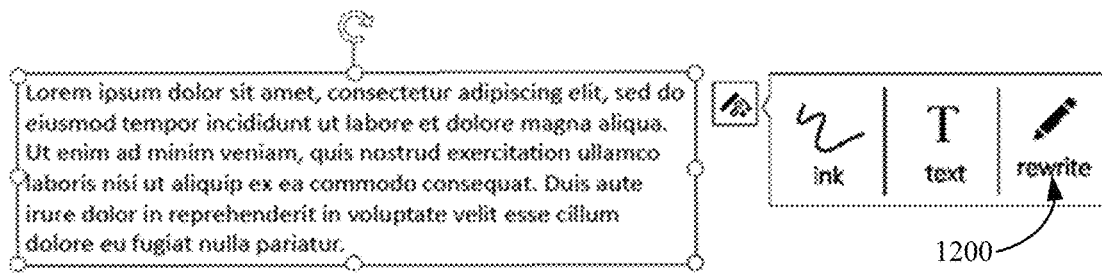
FIG. 12A illustrates an example scenario of providing multi-layered ink objects where the ability to rewrite paragraphs is provided.
Figure 12B:
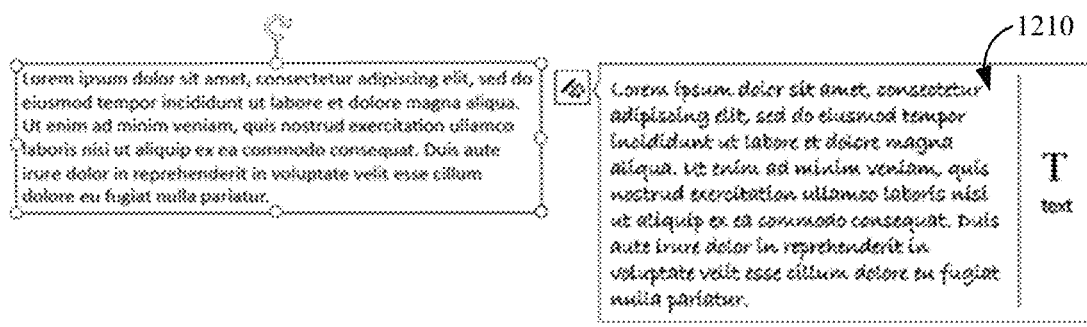
FIG. 12B illustrates an example scenario of providing multi-layered ink objects where a paragraph is rewritten.

FIG. 12A illustrates an example scenario of providing multi-layered ink objects where the ability to rewrite paragraphs is provided; and FIG. 12B illustrates an example scenario of providing multi-layered ink objects where a paragraph is rewritten.

Referring to FIG. 12A, a user may choose to rewrite a previously written paragraph by selecting a rewrite option 1210 provided in the menu interface. Entire paragraphs can be rewritten in the same way as words (as described with respect to FIG. 11A and FIG. 11B). Referring to FIG. 12B, when the user rewrites the paragraph in a rewrite area 1210, one or more content objects are presented associated the newly written paragraph. In this example, the rewrite area 1210 is part of the menu. However, in some cases, the rewrite area may be directly on the canvas.

Figure 13A:
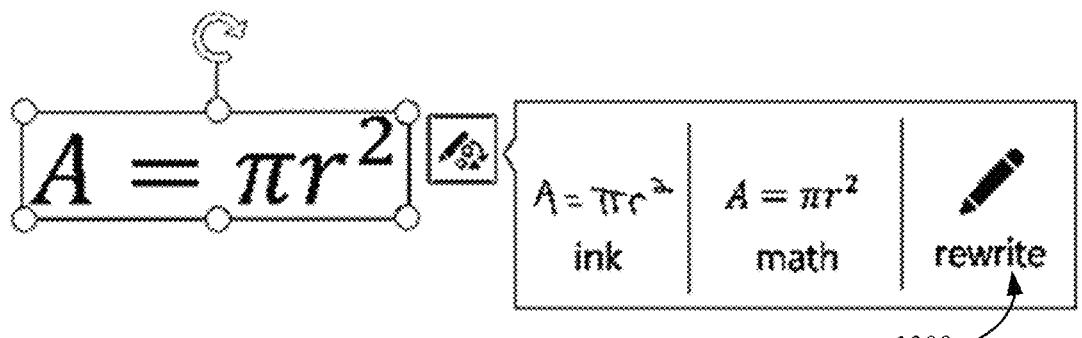
FIG. 13A illustrates an example scenario of providing multi-layered ink objects where the ability to rewrite math equations is provided.
Figure 13B:
FIG. 13B illustrates an example scenario of providing multi-layered ink objects where a math equation is rewritten.

FIG. 13A illustrates an example scenario of providing multi-layered ink objects where the ability to rewrite math equations is provided; and FIG. 13B illustrates an example scenario of providing multi-layered ink objects where a math equation is rewritten.

Referring to FIG. 13A, a user may choose to rewrite a previously written math equation by selecting a rewrite option 1300 provided in the menu interface. Math equations can be rewritten in the same way as words (as described with respect to FIG. 11A and FIG. 11B). Referring to FIG. 12B, when the user rewrites the math equation in a rewrite area 1310, one or more content objects are presented associated the newly written math equation. In this example, the rewrite area 1310 is part of the menu. However, in some cases, the rewrite area may be directly on the canvas.

Figure 14A:
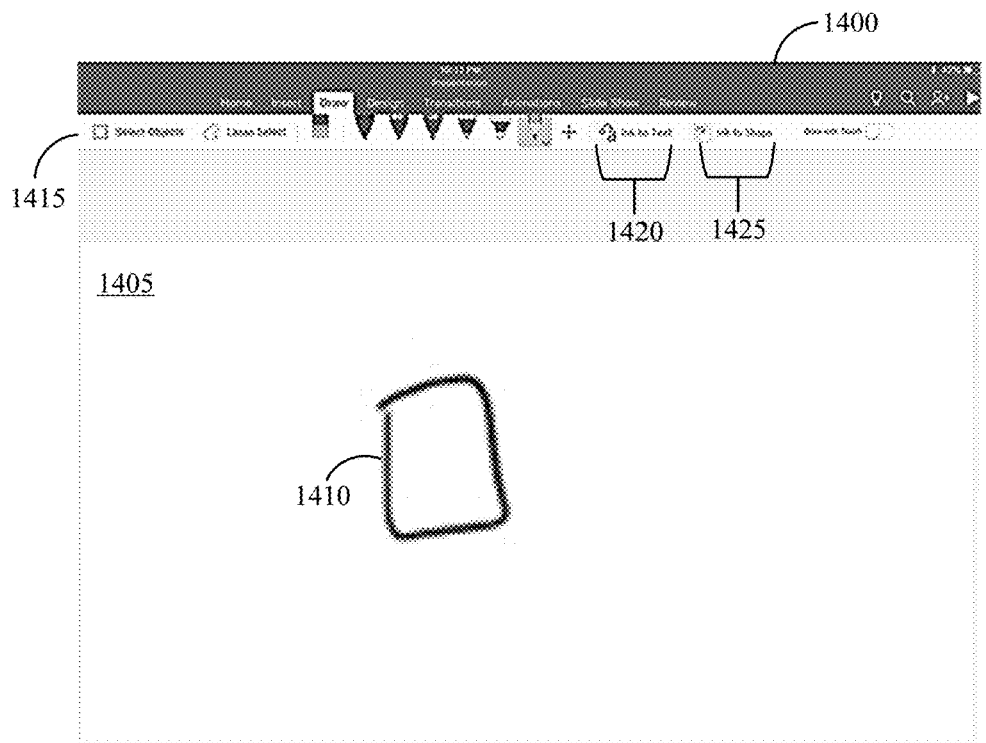
FIG. 14A-14C illustrate an example scenario of providing multi-layered ink objects performed on a mobile device.
Figure 14B:
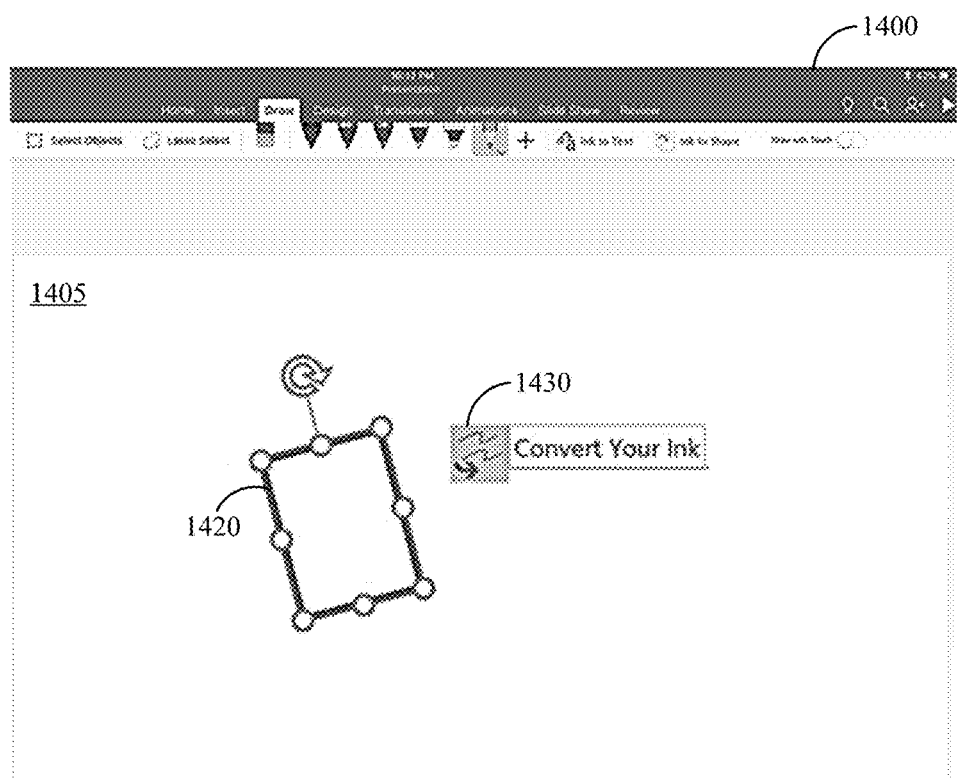
Figure 14C:
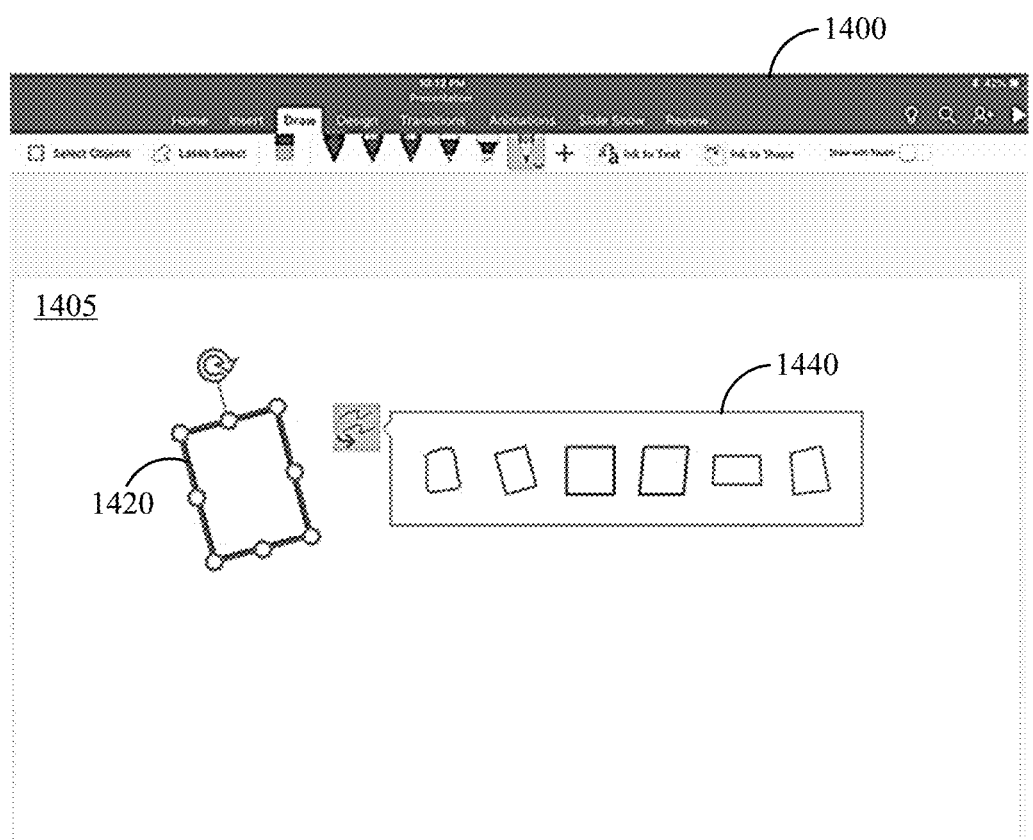

FIGS. 14A-14C illustrate an example scenario of providing multi-layered ink objects performed on a mobile device. A user may open a canvas interface 1405 of a content creation application 1400 on their mobile computing device (embodied, for example, as system 1500 described with respect to FIG. 15). A ribbon 1415 of the content creation application 1400 can include one or more ink conversion commands, such as an "Ink to Text" command 1420 and an "Ink to Shape" command 1425.

Referring to FIG. 14A, the user may input an inked rectangle 1410 onto the canvas interface 1405 of the content creation application 1400. The user can select the "Ink to Shape" command 1425 to initiate an ink object component of the content creation application 1400. It should be understood that the ink object component of the content creation application 1400 may be initiated by any suitable method—directly or indirectly performed by a user—and the illustration of FIG. 14A is meant to be illustrative of one mechanism to initiate the ink object component.

In one case, once the user selects the "Ink to Shape" command 1425, the user is placed on lasso select mode and circling the ink strokes of the inked rectangle will automatically convert them to a shape. The selection of the ink strokes can initiate the transformation of an ink object storing the ink strokes into a multi-layered ink object.

Referring to FIG. 14B, the inked square 1410 described in FIG. 14A can be converted to a shape, such as rectangle 1420. Once converted, an object popover 1430 may be presented indicating that there are more options for the conversion.

Referring to FIG. 14C, once the object popover 1430 described in FIG. 14B is selected, a menu interface 1440 can be displayed. The menu interface 1440 can provide access to the layers of the transformed multi-layered ink object. In the example of FIG. 14C, multiple shapes are provided to the user, such as a rectangle, a square, and a rhombus. The user may cycle through all the presented layers without losing access to the previous layers, including the original ink object. Although the menu interface is shown as a context menu, the layers may be presented in other interfaces, including in a ribbon toolbar, panel at the side or bottom of the display, or one at a time in response to a gesture.

Figure 16:
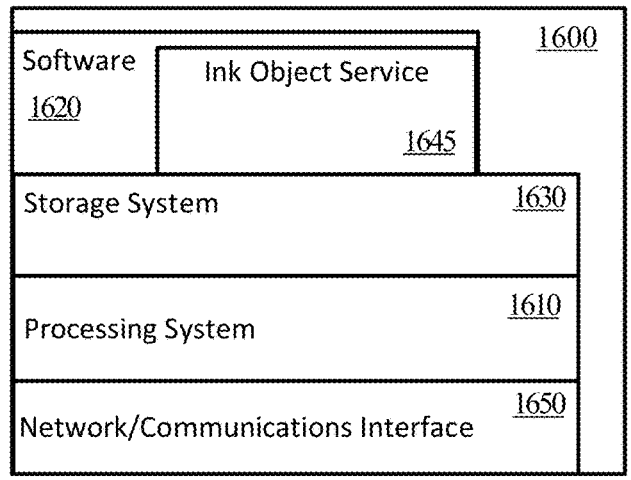
FIG. 16 illustrates components of a computing system that may be used to implement certain methods and services described herein.

FIG. 15 illustrates components of a computing device that may be used in certain embodiments described herein; and FIG. 16 illustrates components of a computing system that may be used to implement certain methods and services described herein.

Referring to FIG. 15, system 1500 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, whiteboard, or a smart television. Accordingly, more or fewer elements described with respect to system 1500 may be incorporated to implement a particular computing device.

System 1500 includes a processing system 1505 of one or more processors to transform or manipulate data according to the instructions of software 1510 stored on a storage system 1515. Examples of processors of the processing system 1505 include general purpose central processing units, application specific processors, and logic devices, as well as any other type of processing device, combinations, or variations thereof. The processing system 1505 may be, or is included in, a system-on-chip (SoC) along with one or more other components such as network connectivity components, sensors, video display components.

The software 1510 can include an operating system 1518 and application programs such as a content creation application 1520 that includes an ink object component and calls the ink object service as described herein. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system 1518 may be implemented both natively on the computing device and on software virtualization layers running atop the native device operating system (OS). Virtualized OS layers, while not depicted in FIG. 15, can be thought of as additional, nested groupings within the operating system space, each containing an OS, application programs, and APIs.

Storage system 1515 may comprise any computer readable storage media readable by the processing system 1505 and capable of storing software 1510 including the content creation application 1520.

Storage system 1515 may include volatile and nonvolatile memory, removable and non-removable media implemented in any method or technology for storage of information, such as computer readable instructions, data structures, program modules, or other data. Examples of storage media of storage system 1515 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 1515 may be implemented as a single storage device but may also be implemented across multiple storage devices or sub-systems co-located or distributed relative to each other. Storage system 1515 may include additional elements, such as a controller, capable of communicating with processing system 1505.

Software 1510 may be implemented in program instructions and among other functions may, when executed by system 1500 in general or processing system 1505 in particular, direct system 1500 or the one or more processors of processing system 1505 to operate as described herein.

The system can further include user interface system 1530, which may include input/output (I/O) devices and components that enable communication between a user and the system 1500. User interface system 1530 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 1530 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

For inclusion of the described ink object component, the user interface system 1530 at least includes a digitizing pen or a touch-based user input interface. A touch-based user input interface can include a touchscreen and/or surface with sensing components for a digitizer. In some cases, a digitizing pen may be used in place of or as part of a touch-based user input interface.

Visual output may be depicted on the display (not shown) in myriad ways, presenting graphical user interface elements, text, images, video, notifications, virtual buttons, virtual keyboards, or any other type of information capable of being depicted in visual form.

The user interface system 1530 may also include user interface software and associated software (e.g., for graphics chips and input devices) executed by the OS 1518 in support of the various user input and output devices. The associated software assists the OS 1518 in communicating user interface hardware events to application programs using defined mechanisms. The user interface system 1530 including user interface software may support a graphical user interface, a natural user interface, or any other type of user interface. For example, the canvas interfaces for the content curation application 1520 described herein may be presented through user interface system 1530.

Network interface 1540 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 1518, which informs applications of communications events when necessary.

Certain aspects described herein, such as those carried out by the ink object service described herein may be performed on a system such as shown in FIG. 16. Referring to FIG. 16, system 1600 may be implemented within a single computing device or distributed across multiple computing devices or sub-systems that cooperate in executing program instructions. The system 1600 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1600 can include a processing system 1610, which may include one or more processors and/or other circuitry that retrieves and executes software 1620 from storage system 1630. Processing system 1610 may be implemented within a single processing device but may also be distributed across multiple processing devices or sub-systems that cooperate in executing program instructions.

Storage system(s) 1630 can include any computer readable storage media readable by processing system 1610 and capable of storing software 1620. Storage system 1630 may be implemented as a single storage device but may also be implemented across multiple storage devices or sub-systems co-located or distributed relative to each other. Storage system 1630 may include additional elements, such as a controller, capable of communicating with processing system 1610. Storage system 1630 may also include storage devices and/or sub-systems on which data such as inked drawing information is stored.

Software 1620, including ink object service 1645, may be implemented in program instructions and among other functions may, when executed by system 1600 in general or processing system 1610 in particular, direct the system 1600 or processing system 1610 to operate as described herein for the ink object service 1645 (and its various components and functionality).

System 1600 may represent any computing system on which software 1620 may be staged and from where software 1620 may be distributed, transported, downloaded, or otherwise provided to yet another computing system for deployment and execution, or yet additional distribution.

In embodiments where the system 1600 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communication interface 1650 may be included, providing communication connections and devices that allow for communication between system 1600 and other computing systems (e.g., systems supporting services such as 214 described with respect to FIG. 2) over a communication network or collection of networks (not shown) or the air.

Certain techniques set forth herein with respect to the content creation application and/or ink service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that, as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving one or more ink strokes in an application;
displaying the one or more ink strokes in a canvas interface of the application;
storing the one or more ink strokes in an ink object;
transforming the ink object into a multi-layered ink object by:
obtaining content objects based on recognized entities of the ink object, and
generating a data structure storing the content objects associated with the ink object, wherein the ink object and the content objects are stored in the generated data structure, wherein each of the ink object and the content objects stored in the generated data structure are a layer of the multi-layered ink object; and
in response to a designated gesture, converting between layers of the multi-layered ink object while maintaining access to each layer of the multi-layered ink object, wherein converting between the layers of the multi-layered ink object includes displaying, at the canvas interface, any of the content objects or the one or more ink strokes in the multi-layered ink object in place of the one or more ink strokes.

2. The method of claim 1, further comprising:
displaying the ink object and one or more of the content objects in a menu interface in the application.

3. The method of claim 2, wherein converting between the layers of the multi-layered ink object comprises:
receiving a first selection of one of the one or more of the content objects displayed in the menu interface as the designated gesture;
displaying the first selected content object from the generated data structure in place of the one or more ink strokes in the canvas interface;
in response to receiving a second selection of one of the one or more of the content objects displayed in the menu interface as the designated gesture, displaying the second selected content object from the generated data structure in place of the first selected content object in the canvas interface, the first selected content object being a different content object than the second selected content object; and
in response to receiving a third selection of one of the one or more of the content objects displayed in the menu interface as the designated gesture, displaying the third selected content object from the generated data structure in place of the second selected content object in the canvas interface, the third selected content object being the same content object as the first selected content object.

4. The method of claim 3, further comprising:
in response to receiving a selection of the ink object displayed in the menu interface, displaying the one or more ink strokes in place of the third selected content object.

5. The method of claim 2, wherein the menu interface in the application is a contextual menu or a ribbon.

6. The method of claim 1, wherein generating the data structure storing the content objects associated with the ink object comprises:
determining a category for each of the content objects; and
storing each of the content objects associated with the determined category.

7. The method of claim 6, further comprising:
displaying the ink object and one or more of the content objects in a menu interface in the application, wherein the one or more of the content objects displayed in the menu interface are displayed based on the determined category.

8. The method of claim 7, further comprising:
in response to receiving a first selection of one of the one or more of the content objects displayed in the menu interface, displaying, in the menu interface, one or more additional content objects stored in the generated data structure having a same category as the first selected content object.

9. The method of claim 1, further comprising:
obtaining context information; and
updating the generated data structure based on the context information.

10. The method of claim 9, wherein updating the generated data structure based on the context information comprises:
ranking the content objects based on the context information.

11. The method of claim 1, further comprising:
in response to a manipulation being performed on content displayed in the application, updating the generated data structure based on the performed manipulation.

12. The method of claim 11, wherein the performed manipulation is a rotation, wherein updating the generated data structure based on the performed manipulation comprises rotating at least one of the content objects.

13. The method of claim 11, wherein the performed manipulation is a color change, wherein updating the generated data structure based on the performed manipulation comprises changing at least one of the content objects to a same color of the color change.

14. The method of claim 1, wherein obtaining the content objects based on recognized entities of the ink object comprises:
communicating the one or more ink strokes to an ink service; and
receiving results of an ink analysis, the results being recognized entities of the ink object, wherein each of the content objects comprises a recognized entity.

15. A system comprising:
a processing system;
a storage system; and
instructions stored on the storage system that, when executed by the processing system, direct the processing system to:
receive one or more ink strokes in an application;
display the one or more ink strokes in a canvas interface of the application;
store the one or more ink strokes in an ink object;

transform the ink object into a multi-layered ink object by:
  obtaining content objects based on recognized entities of the ink object, and
  generating a data structure storing the content objects associated with the ink object, wherein the ink object and the content objects are stored in the generated data structure, wherein each of the ink object and the content objects stored in the generated data structure are a layer of the multi-layered ink object; and
in response to a designated gesture, convert between layers of the multi-layered ink object while maintaining access to each layer of the multi-layered ink object, wherein converting between layers of the multi-layered ink object includes displaying, at the canvas interface, any of the content objects or the one or more ink strokes in the multi-layered ink object in place of the one or more ink strokes.

16. The system of claim 15, wherein the instructions stored on the storage system further direct the processing system to:
  display the ink object and one or more of the content objects in a menu interface in the application,
  wherein the instructions that convert between the layers of the multi-layered ink object comprises further direct the processing system to:
    receive a first selection of one of the one or more of the content objects displayed in the menu interface as the designated gesture;
    display the first selected content object from the generated data structure in place of the one or more ink strokes in the canvas interface;
    in response to receiving a second selection of one of the one or more of the content objects displayed in the menu interface as the designated gesture, display the second selected content object from the generated data structure in place of the first selected content object in the canvas interface, the first selected content object being a different content object than the second selected content object;
    in response to receiving a third selection of one of the one or more of the content objects displayed in the menu interface as the designated gesture, display the third selected content object from the generated data structure in place of the second selected content object in the canvas interface, the third selected content object being the same content object as the first selected content object; and
    in response to receiving a selection of the ink object displayed in the menu interface, display the one or more ink strokes in place of the third selected content object.

17. The system of claim 15, wherein the instructions that generate the data structure storing the content objects associated with the ink object further direct the processing system to:
  determine a category for each of the content objects; and
  store each of the content objects associated with the determined category,
  wherein the instructions stored on the storage system further direct the processing system to:
    display the ink object and one or more of the content objects in a menu interface in the application, wherein the one or more of the content objects displayed in the menu interface are displayed based on the determined category, and
    in response to receiving a first selection of one of the one or more of the content objects displayed in the menu interface, displaying, in the menu interface, one or more additional content objects stored in the generated data structure having a same category as the first selected content object.

18. The system of claim 15, wherein the instructions that transform the ink object into a multi-layered ink object further direct the processing system to:
  obtain context information; and
  update the generated data structure based on the context information or based on a manipulation performed on content displayed in the application.

19. The system of claim 15, wherein the instructions that obtain the content objects based on the recognized entities of the ink object further direct the processing system to:
  communicate the one or more ink strokes to an ink service; and
  receive results of an ink analysis, the results being recognized entities of the ink object, wherein each of the content objects comprises a recognized entity.

20. One or more computer readable storage media having instructions stored thereon that, when executed by a processor, direct the processor to at least:
  receive one or more ink strokes in an application;
  display the one or more ink strokes in a canvas interface of the application;
  store the one or more ink strokes in an ink object;
  transform the ink object into a multi-layered ink object by:
    obtaining content objects based on recognized entities of the ink object, and
    generating a data structure storing the content objects associated with the ink object, wherein the ink object and the content objects are stored in the generated data structure, wherein each of the ink object and the content objects stored in the generated data structure are a layer of the multi-layered ink object;
  display the ink object and one or more of the content objects in a menu interface in the application; and
  in response to a designated gesture, convert between layers of the multi-layered ink object while maintaining access to each layer of the multi-layered ink object, wherein the instructions that convert between the layers of the multi-layered ink object further direct the processor to:
    receive a first selection of one of the one or more of the content objects displayed in the menu interface as the designated gesture,
    display the first selected content object from the generated data structure in place of the one or more ink strokes in the canvas interface,
    in response to receiving a second selection of one of the one or more of the content objects displayed in the menu interface as the designated gesture, display the second selected content object from the generated data structure in place of the first selected content object in the canvas interface, the first selected content object being a different content object than the second selected content object,
    in response to receiving a third selection of one of the one or more of the content objects displayed in the menu interface as the designated gesture, display the third selected content object from the generated data structure in place of the second selected content object in the canvas interface, the third selected content object being the same content object as the first selected content object, and in response to receiving a selection of the ink object displayed in the menu interface, display the one or more ink strokes in place of the third selected content object.

\* \* \* \* \*